US006998805B2

(12) United States Patent
Nireki et al.

(10) Patent No.: US 6,998,805 B2
(45) Date of Patent: Feb. 14, 2006

(54) MOTOR STOP CONTROL DEVICE

(75) Inventors: Takao Nireki, Tokyo (JP); Shingo Omono, Tokyo (JP); Yuichiro Suzuki, Tokyo (JP)

(73) Assignee: Aruze Corp., Tokyo (JP)

( * ) Notice: Subject to any disclaimer, the term of this patent is extended or adjusted under 35 U.S.C. 154(b) by 0 days.

(21) Appl. No.: 10/697,085

(22) Filed: Oct. 31, 2003

(65) Prior Publication Data

US 2004/0222760 A1    Nov. 11, 2004

(30) Foreign Application Priority Data

May 9, 2003 (JP) .............................. 2003-131411

(51) Int. Cl.
*H02P 3/00* (2006.01)
*A63F 5/00* (2006.01)
*G06F 19/00* (2006.01)

(52) U.S. Cl. .................... 318/362; 318/364; 318/373; 273/142 R; 273/143 R; 273/142 H; 463/20

(58) Field of Classification Search ............... 318/445, 318/362–382; 273/142 R, 143, 138.1, 142 H, 273/143 R; 463/20, 16
See application file for complete search history.

(56) References Cited

U.S. PATENT DOCUMENTS

| 3,733,075 A | * | 5/1973 | Hooker et al. .......... 273/141 A |
| 4,071,246 A | * | 1/1978 | Hooker .................... 273/143 R |
| 4,363,486 A | * | 12/1982 | Chaudhry et al. ....... 273/143 B |
| 4,594,620 A | | 6/1986 | Shoji |
| 4,625,931 A | * | 12/1986 | Tamura et al. ........... 242/423.1 |
| 4,711,452 A | * | 12/1987 | Dickinson et al. ...... 273/143 R |
| 4,765,078 A | * | 8/1988 | Yamamoto ................... 40/309 |
| 4,772,022 A | * | 9/1988 | Yoshitomi ............... 273/143 R |
| 4,831,477 A | | 5/1989 | Sakamoto et al. |
| 5,609,524 A | | 3/1997 | Inoue |
| 6,540,227 B1 | * | 4/2003 | Inoue ..................... 273/143 R |
| 2004/0018869 A1 | * | 1/2004 | Inoue .......................... 463/20 |
| 2004/0224752 A1 | * | 11/2004 | Nireki et al. ................. 463/20 |

FOREIGN PATENT DOCUMENTS

| EP | 0 317 146 | 5/1989 |
| EP | 0 380 928 | 8/1990 |
| GB | 546288 | 12/1940 |
| GB | 1 471 866 | 4/1977 |

(Continued)

OTHER PUBLICATIONS

European Search Report (Aug. 30, 2004).

*Primary Examiner*—Marlon T. Fletcher
*Assistant Examiner*—Patrick Miller
(74) *Attorney, Agent, or Firm*—Rader, Fishman & Grauer PLLC

(57) ABSTRACT

The invention is a motor stop control device for a rotating reel type gaming machine 1 which includes a stepping motor 70 having two pairs of excitation phases as a driving source of reels 3 having a plurality of symbols drawn thereon and in which the stepping motor is stopped in accordance with an operational instruction from outside. The device includes a deceleration transmission mechanism 700 for transmitting the rotation of the stepping motor 70 to rotating shafts for rotating the reels 3 at a predetermined reduction ratio and a main CPU 40 for performing control for reducing the rotating speed of the stepping motor 70 when a stop command for the stepping motor 70 is generated according to an operational instruction from the outside and for performing stop control of the stepping motor 70 through two-phase excitation.

11 Claims, 22 Drawing Sheets

FOREIGN PATENT DOCUMENTS

| | | |
|---|---|---|
| GB | 2 059 520 | 4/1981 |
| GB | 2 150 335 | 6/1985 |
| GB | 2317505 A * | 3/1998 |
| JP | 06-319296 A | 11/1994 |
| JP | 09010388 A * | 1/1997 |
| JP | 09-327553 | 12/1997 |
| JP | 09-327553 A | 12/1997 |
| JP | 10-71240 A1 | 3/1998 |
| JP | 11226178 A * | 8/1999 |
| JP | 2002-159627 | 6/2002 |
| JP | 2002-159627 A | 6/2002 |
| JP | 2003-117076 | 4/2003 |
| JP | 2003-117076 A | 4/2003 |
| JP | 2003117076 A * | 4/2003 |
| JP | 2003144642 A * | 5/2003 |
| JP | 2004105541 A * | 4/2004 |
| JP | 2004141521 A * | 5/2004 |
| RU | 2 133 550 C1 | 7/1999 |
| SU | 736335 | 5/1980 |
| SU | 864481 | 9/1981 |

* cited by examiner

Fig.5
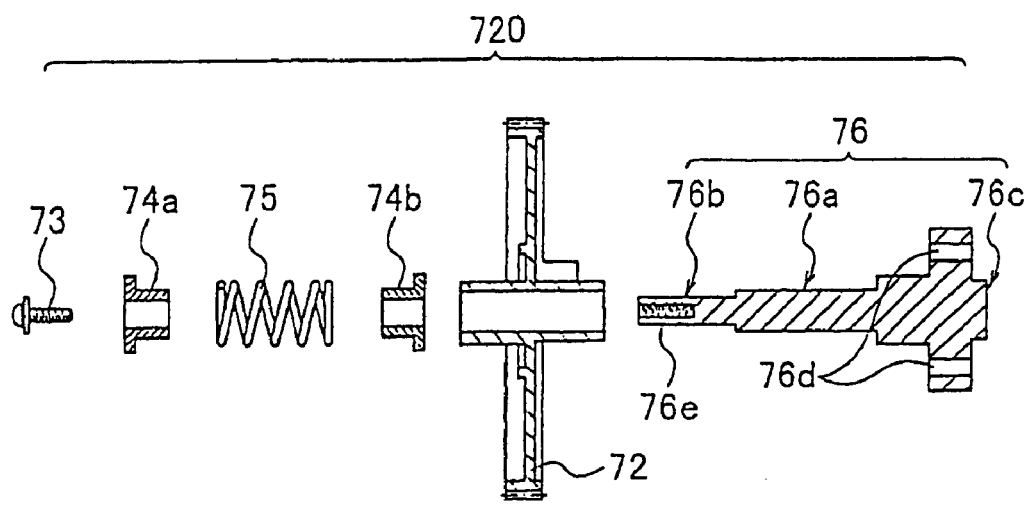
(a)
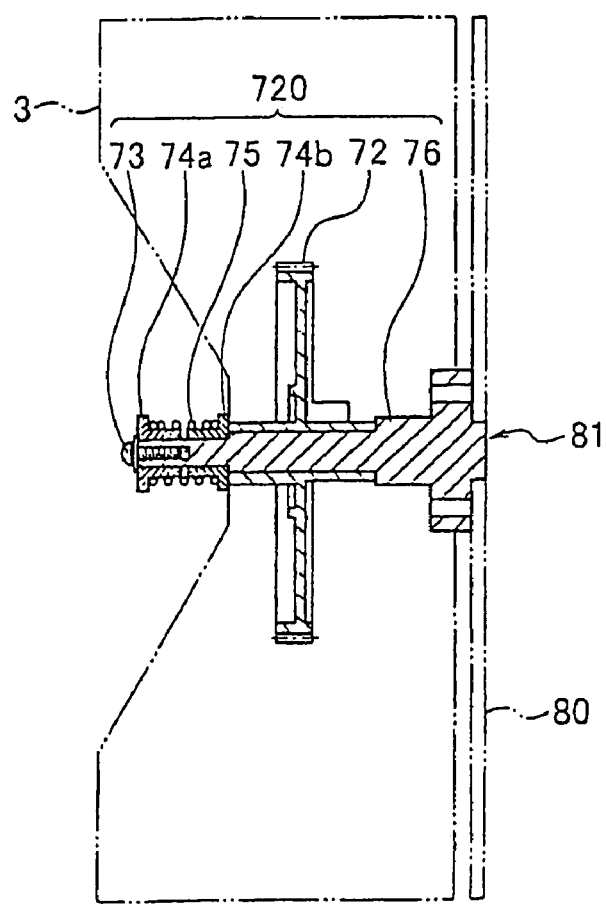
(b)

Fig.8

《REEL STOPPING PROCESS》

| | STOPPING PROCESS | | HOLDING PROCESS | |
|---|---|---|---|---|
| | SYMBOL PROCESS | DECELERATION PROCESS | EXCITATION PROCESS | VIBRATION-SUPPRESSING EFFECT BY VIBRATION-SUPPRESSING MEMBER |
| COMMON REEL STOPPING PROCESS | ○ | × | ALL PHASE ON | × |
| FIRST REEL STOPPING PROCESS | ○ | ○ | TWO PHASE ON | × |
| SECOND REEL STOPPING PROCESS | ○ | × | TWO PHASE ON | ○ |
| THIRD REEL STOPPING PROCESS | ○ | ○ | TWO PHASE ON | ○ |

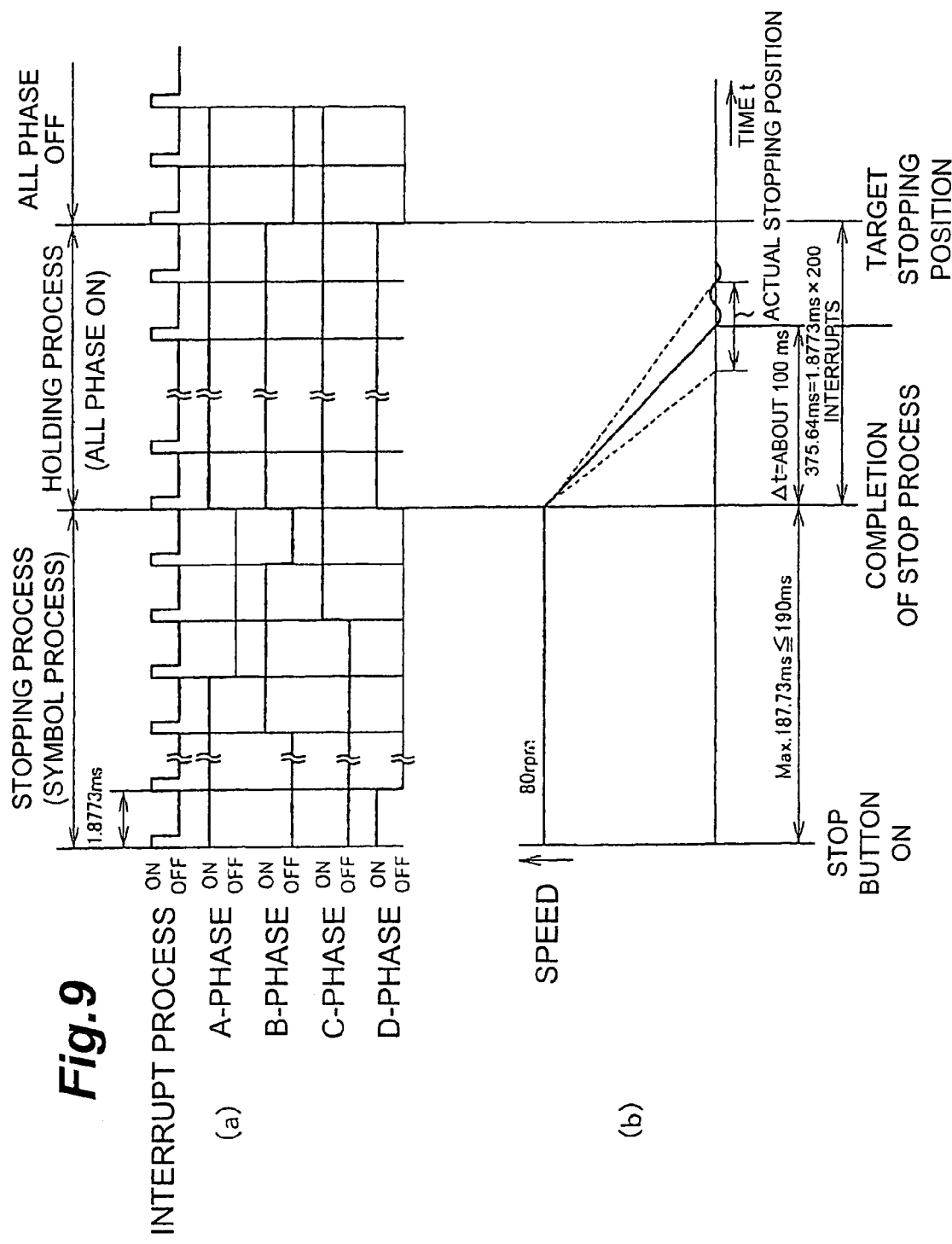

Fig.14
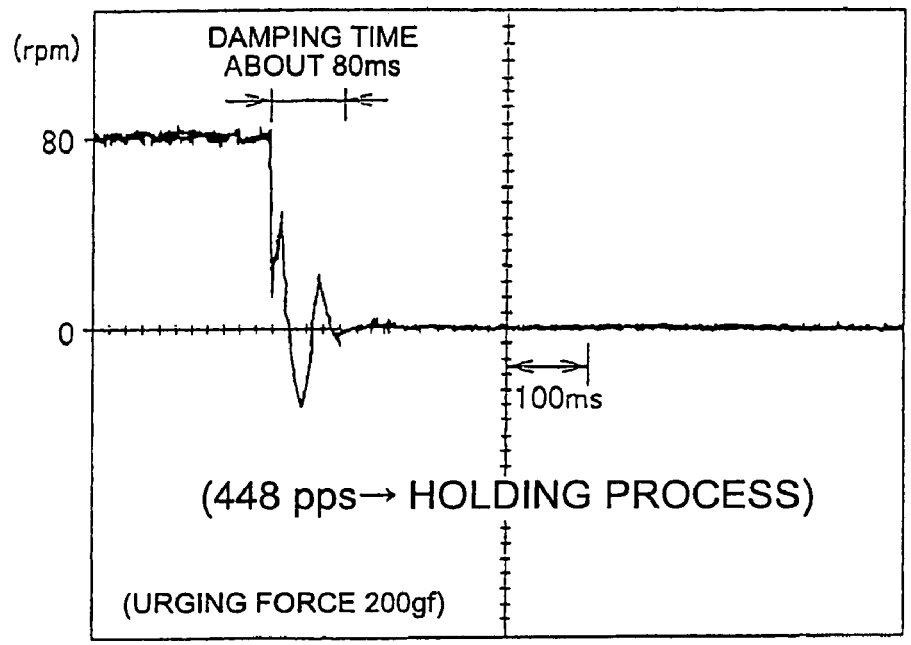
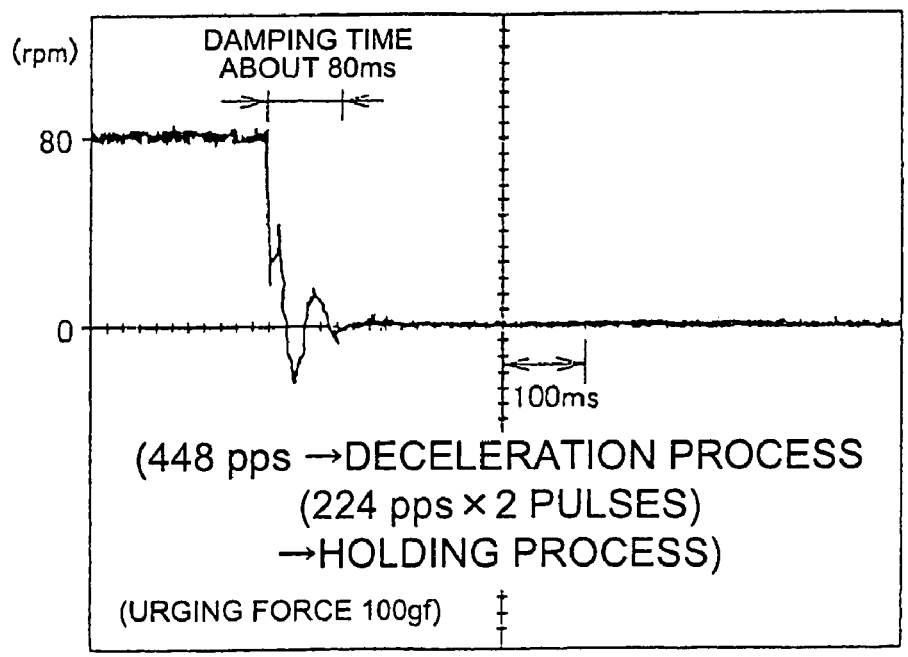

Fig.17
(a)
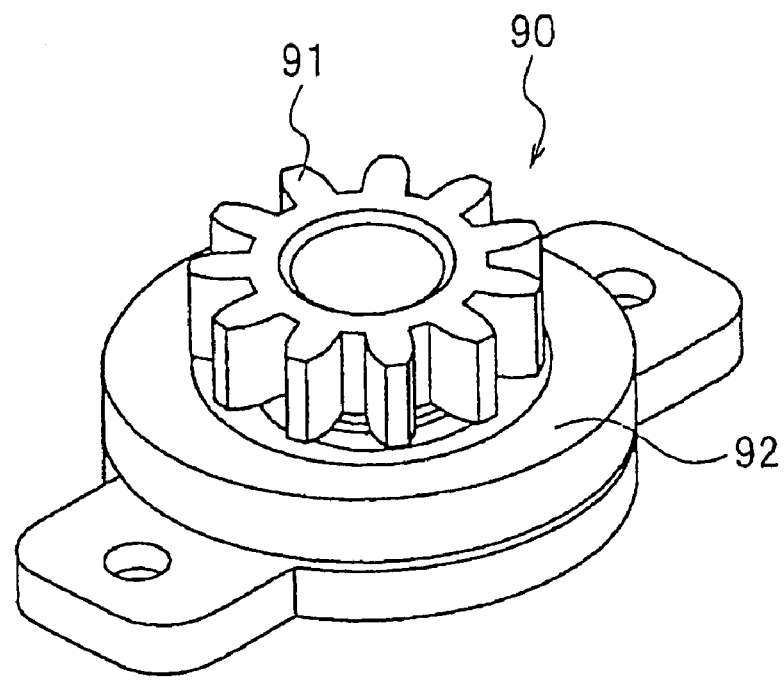
(b)
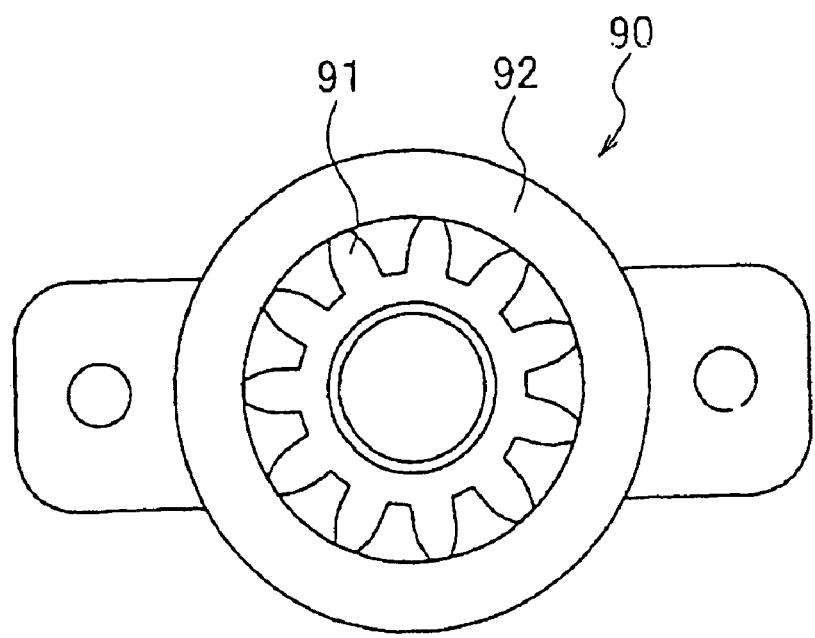

MOTOR STOP CONTROL DEVICE

FIELD OF THE TECHNOLOGY

This invention relates to a motor stop control device for a rotating reel type gaming machine which includes a motor having two pairs of excitation phases as a driving source of reels having a plurality of symbols drawn thereon and in which the motor is stopped in accordance with an operational instruction from outside.

DESCRIPTION OF RELATED ART

Conventionally, in a symbol changing device for a rotating reel type gaming machine (e.g., a pachi-slot machine), reels are directly connected to a rotating shaft of a stepping motor (direct drive method). Since the direct drive method involves a structure in which rotational torque of the stepping motor is directly transmitted to the rotating shafts of the reels, the structure around the stepping motor is simplified.

For example, see Japanese Patent Laid-Open Publication No. 71240/1998 (pp. 4–5, FIG. 1).

SUMMARY OF THE INVENTION

However, since the direct drive method involves no mechanical decelerating means, the stepping motor has been required to generate rotational torque in accordance with the inertia of the reels, and an expensive stepping motor capable of generating high torque (e.g., a hybrid type) has been therefore used. This has resulted in a problem in that a significant reduction cannot be achieved in the manufacturing cost of a reel unit including the stepping motor.

Further, according to the direct drive method, reels are controlled by performing stop control of the stepping motor through full-phase excitation, and it is common to employ a method utilizing detent torque of the stepping motor. However, the detent torque can vary from reel to reel, and inertia also varies from reel to reel. Therefore, the stopping positions of the symbols have been unstable, and it has been impossible to stop the symbols displayed on the surface of the reels with high accuracy.

In addition, in order to prevent variation of the stopping positions of the symbols, a screening operation for obtaining a stepping motor having less variation of detent torque is required, and an operator must adjust balance between the detent torque and the reel inertia (moment of inertia) through gauging (balance adjustment). In this case, a problem has arisen in that the number of steps for assembling a reel unit is increased.

The invention has been made taking the above points into consideration, and it is an object of the invention to provide a motor stop control device which makes it possible to reduce the cost of a stepping motor, to manufacture a reel unit with a smaller number of steps, and to stop the reel at accurate positions without reducing the smoothness of the braking of the stepping motor.

To solve the above problems, this invention provides a motor stop control device for a rotating reel type gaming machine which includes a motor having two pairs of excitation phases as a driving source of a reel having a plurality of symbols drawn thereon and in which the motor is stopped in accordance with an operational instruction from outside, the device comprising a deceleration transmission mechanism for transmitting a rotation of a motor to rotating shafts for rotating the reel at a predetermined reduction ratio (e.g., a deceleration transmission mechanism 700) and a motor stop control means (e.g., a main CPU 40) which performs control for reducing a rotating speed of the motor and performs stop control of the motor through two-phase excitation when a motor stop command is generated according to an operational instruction from the outside.

According to the invention as thus described, since the rotation of the motor is transmitted to the rotating shafts for rotating the reel at a predetermined reduction ratio, a designer can adopt a low cost motor having small rotational torque (e.g., a PM type). Further, since the motor stop control means performs motor stop control through two-phase excitation after performing control for reducing the rotating speed of the motor, the motor stop control means can stop the reel at accurate positions.

Further, since the motor stop control means performs the control for reducing the rotating speed of the motor, the motor stop control means can more preferably stop the reel at accurate positions without reducing the smoothness of the braking of the motor than reducing the motor rotating speed abruptly. Since the stoppage of the reel is thus independent upon braking utilizing detent torque, no balance adjustment as described above is required at the time of manufacture, and operators can manufacture a reel unit with a small number of steps.

This invention may provide a motor stop control device for a rotating reel type gaming machine which includes a motor having two pairs of excitation phases as a driving source of a reel having a plurality of symbols drawn thereon and in which the motor is stopped in accordance with an operational instruction from the outside, the device comprising a deceleration transmission mechanism for transmitting the rotation of the motor to rotating shafts for rotating the reel at a predetermined reduction ratio, a motor stop control means for performing stop control of the motor through two-phase excitation when a motor stop command is generated according to an operational instruction from the outside, and vibration-suppressing means (e.g., a vibration-suppressing member 75) for damping vibration of the reel generated when the rotation of the reel is stopped by stop control of the motor stop control means.

In the above-described aspect of the invention, the motor stop control means may perform the stop control through two-phase excitation on the motor after performing the control for reducing the rotating speed of the motor when a stop command for the motor is generated by an operational instruction from the outside.

According to the invention as thus described, since the rotation of the motor is transmitted to the rotating shafts for rotating the reel at a predetermined reduction ratio, a designer can adopt a low cost motor having small rotational torque. Further, since the motor stop control means performs motor stop control through two-phase excitation, the motor stop control means can stop the reel at accurate positions.

Further, since the vibration-suppressing member provides a braking function when the reel are rotating and damps the vibration of the reel occurring when the motor is braked, the vibration-suppressing member allows the reel to be stopped at accurate positions without reducing the smoothness of the braking of the motor. As a result, no balance adjustment as described above is required at the time of manufacture, and operators can manufacture a reel unit with a small number of steps.

The reduction ratio is preferably determined by the ratio between the number of steps of one rotation of the motor and the least common multiple calculated from the number of symbols displayed on the reel and the number of steps of one rotation of a stepping motor 70. In this case, since the reduction ratio is determined by the ratio between the number of steps of one rotation of the motor and the least common multiple calculated from the number of symbols displayed on the reel and the number of steps of one rotation of the stepping motor 70, the motor can stop a symbol at an appropriate position because of the reduction ratio.

The vibration-suppressing member may be an oil damper, a high friction member (e.g., rubber or felt) or a wave washer. The deceleration transmission mechanism may be formed by a plurality of rubber roller trains which is formed of a soft member including rubber or polyamide. The deceleration transmission mechanism may be configured by combining an expandable and contractible belt formed of a soft member including rubber or urethane with input and output pulleys. Further, the deceleration transmission mechanism may comprise an output-side gear and an input-side gear constituted by spur gears, and either of the output-side gear and the input-side gear may be a scissors gear. Furthermore, the material of the spur gears may be a soft member such as polyamide.

BRIEF DESCRIPTION OF THE DRAWINGS

FIG. 5, consisting of FIG. 5(*a*) to 5(*b*), is showing a structure of a shaft supporting portion of the embodiment;

FIG. 8 shows the contents of reel stopping processes of the embodiment;

FIG. 9 shows the contents of a "general reel stopping process" of the embodiment;

FIG. 14, consisting of FIG. 14(*a*) to 14(*b*), is showing waveforms actually measured at the reel stopping process of the embodiment;

FIG. 17, consisting of FIG. 17(*a*) to 17(*b*), is showing a structure of oil dampers in a first modification;

DETAILED DESCRIPTION OF THE INVENTION

[Basic Configuration of Motor Stop Control Device]

Figure 1:
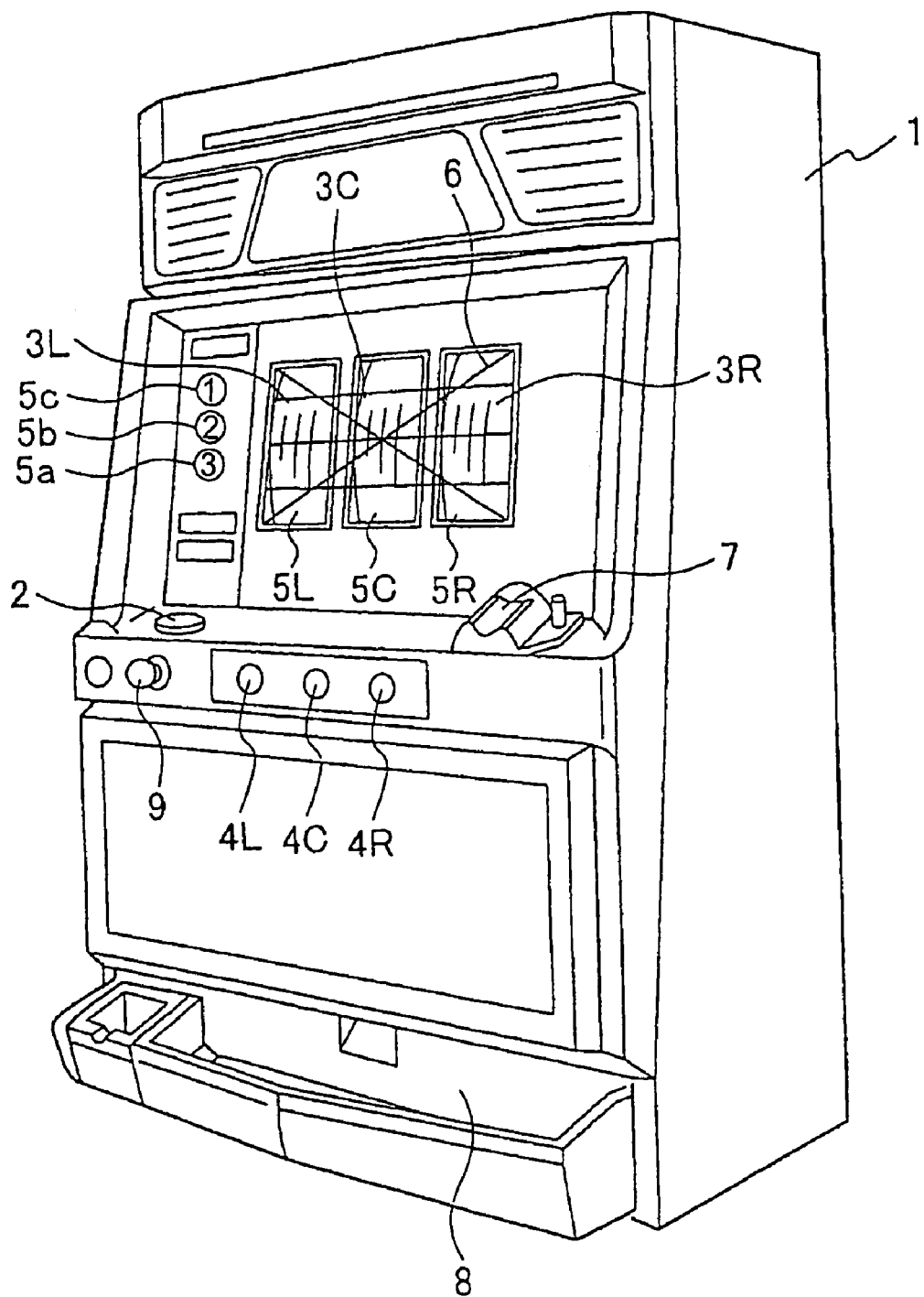
FIG. 1 is a front view showing a front surface of a gaming machine according to an embodiment of this invention.

A motor stop control device according to an embodiment will now be described with reference to the drawings. FIG. 1 shows an appearance of a rotating reel type gaming machine 1 according to this embodiment.

As shown in FIG. 1, three panel display windows 5L, 5C and 5R are formed on a front surface of a cabinet that forms the outline of the rotating reel type gaming machine 1 as a whole. Reels 3L, 3C and 3R that form a reel unit are visually observed through those panel display windows 5L, 5C and 5R. Five pay lines 6 are drawn on the panel display windows 5L, 5C and 5R such that three of them extend horizontally and two diagonally, and the number of pay lines 6 that are enabled is determined by the number of coins inserted into an insertion slot 7.

When a player inserts coins and operates a start lever 9, the reels 3L, 3C and 3R starts rotating. When the player presses stop buttons 4L, 4C and 4R provided in association with the reels 3L, 3C and 3R, respectively, the rotation of the respective reels 3L, 3C and 3R stops. A prize-winning status is determined by the combination of symbols on the respective reels 3L, 3C and 3R observed through the panel display windows 5L, 5C and 5R when the rotation stops. When a prize is won, coins are paid out into a tray 8 in a quantity associated with the prize-wining status.

Figure 2:
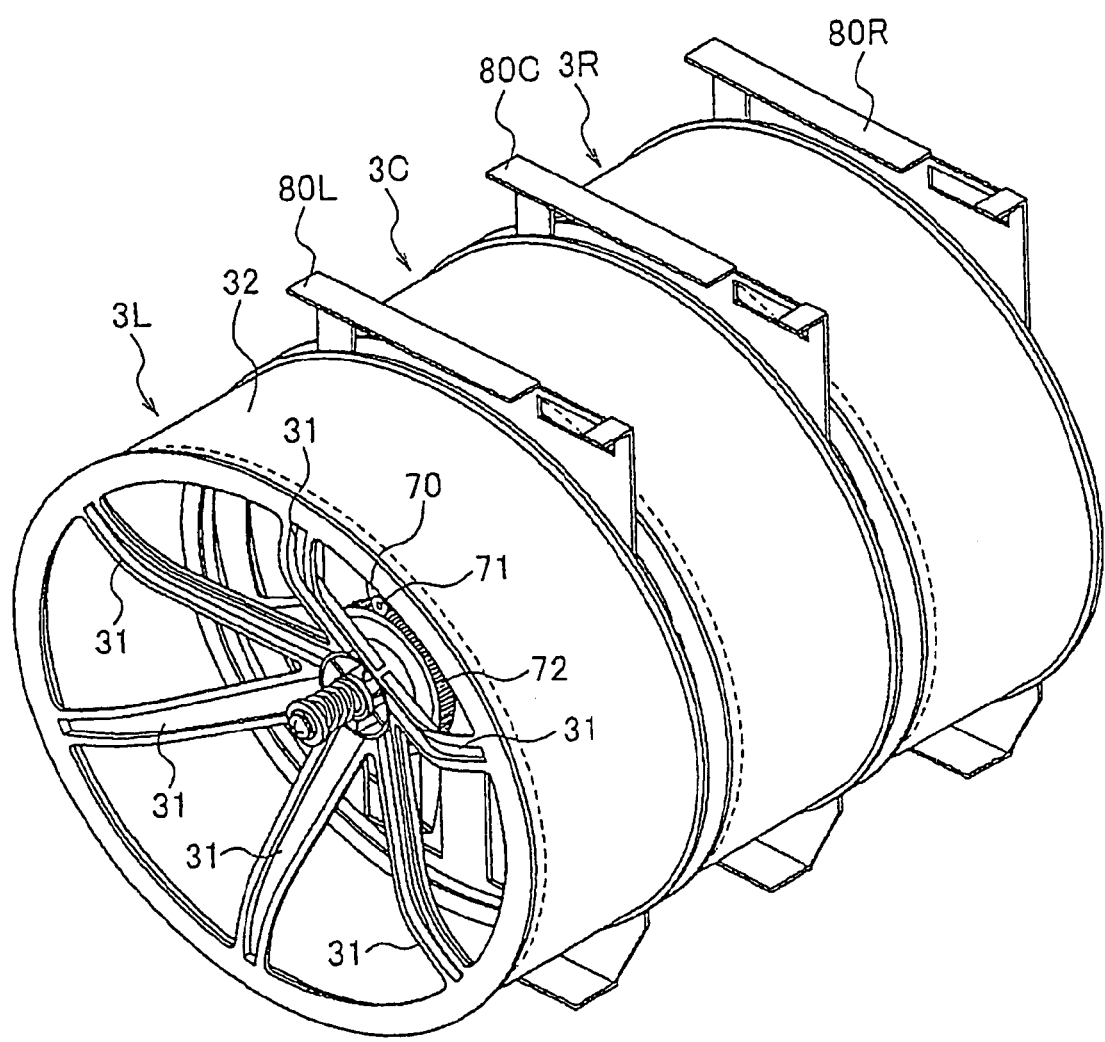
FIG. 2 is a perspective view showing a configuration of reels of this embodiment taken in a direction diagonal thereto.

FIG. 2 is a perspective view showing a configuration of a reel unit provided inside the respective panel display windows 5L, 5C and 5R. As shown in FIG. 2, the reel unit has three mounting plates 80L, 80C and 80R, three reels 3L, 3C and 3R provided inside the respective mounting plates 80L, 80C and 80R, and three PM-type stepping motors 70L, 70C and 70R for driving the reels 3L, 3C and 3R for rotation independently of each other.

For convenience, the following description will focus on the reel 3L (reel 3), the mounting plate 80L (mounting plate 80), and the stepping motor 70L (stepping motor 70) located on the right among the three reels 3L, 3C and 3R, the three mounting plates 80L, 80C and 80R, and the three stepping motors 70L, 70C and 70R, respectively. Unless otherwise specified, the other respective reels 3C and 3R, respective plating plates 80C and 80R, and respective stepping motors 70C and 70R are identical in configuration.

Figure 3:
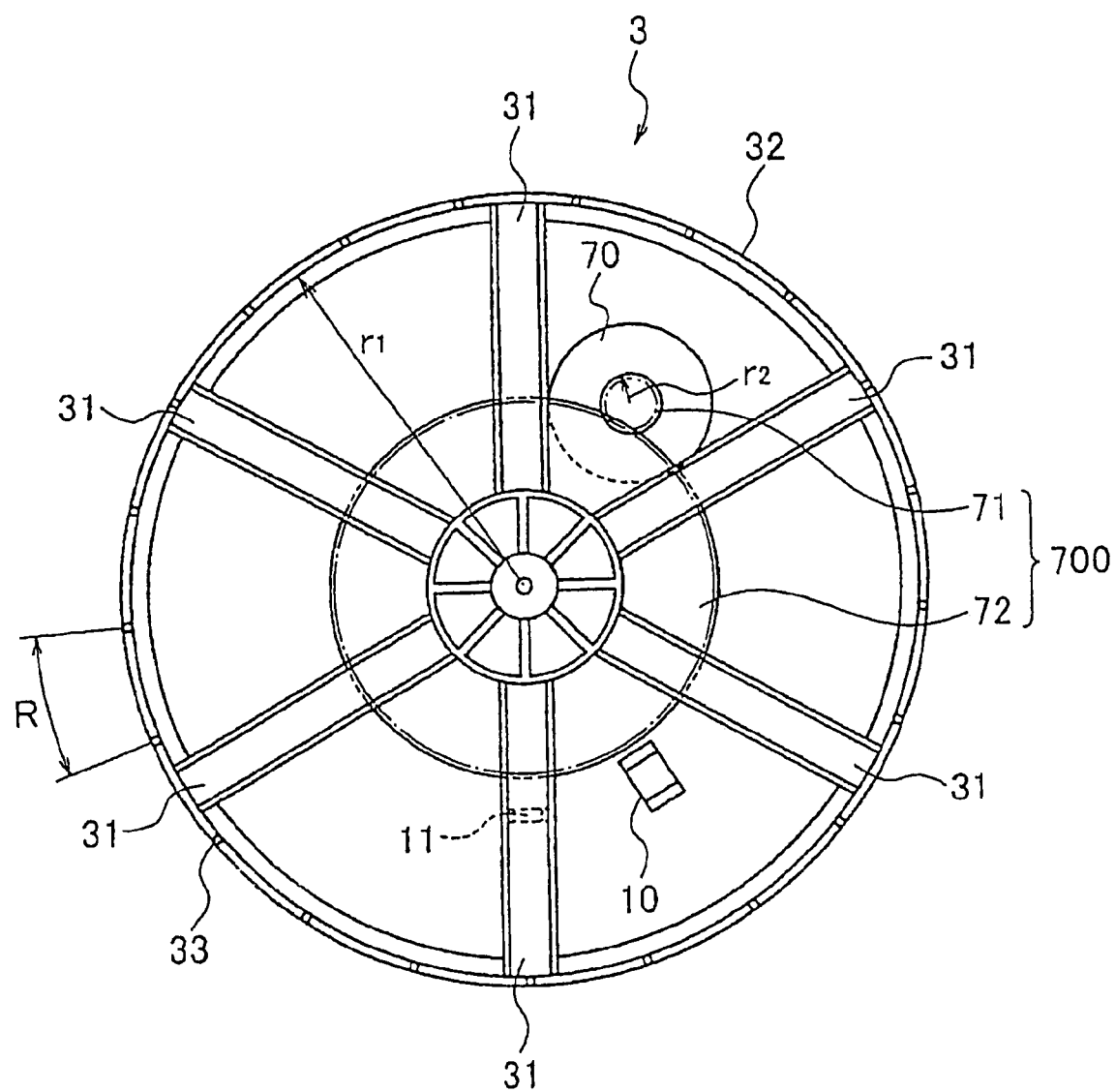
FIG. 3 shows a side of a reel of the embodiment.

FIG. 3 is a right side view of the reel 3. As shown in FIG. 3, a position-detecting sensor 10 as a reel position detecting circuit for detecting the rotating position of the reel 3 is provided on the mounting plate 80 (not shown) within a rotating radius r1 of the reel 3. The reel 3 is pivotally supported at the center thereof such that it can rotate about a reel post 76 perpendicularly extending from a surface of the mounting plate 80.

As shown in FIG. 3, the reel 3 comprises six arms 31 radially extending from the center thereof and a cylindrical member 32 that is integrally formed with ends of the respective arms 31 in the extending direction thereof so as to extend between them. On one of the arms 31, a detection piece 11 to serve as a reference position is provided in a position that can be detected by a position-detecting sensor 10. The detection piece 11 is provided such that it passes through the position-detecting sensor 10 each time the reel 3 makes one rotation. The position-detecting sensor 10 is formed to be able to output a detection signal each time it detects the detection piece 11 as the detection piece 11 passes through the same.

In this embodiment, a total of twenty-one symbol marks 33 are printed at constant intervals at a side peripheral edge of the cylindrical member 32. A symbol sheet (not shown) is applied. The symbol sheet is attached to an outer periphery of the cylindrical member 32 using a method such as boding such that symbols displayed thereon is centered on the symbol marks 33.

As shown in FIG. 3, a deceleration transmission mechanism 700 is disposed between a drive shaft of the stepping motor 70 and a rotating shaft of the reel 3. The deceleration transmission mechanism 700 transmits rotation of the stepping motor 70 to the rotating shaft that rotates the reel 3 at a predetermined reduction ratio.

As shown in FIG. 3, the deceleration transmission mechanism 700 has an output-side gear 71 provided on a driving side of the stepping motor 70 and an input-side gear 72 disposed at the reel 3 such that it is in contact with the output-side gear 71 and coaxial with the support shaft of the reel 3.

For example, spur gears are used as the output-side gear 71 and the input-side gear 72. The number of teeth of the input-side gear 72 of this embodiment is set at seven times that of the output-side gear 71. Therefore, the deceleration transmission mechanism 700 is configured to transmit the speed of rotation of the stepping motor 70 to the reel 3 with a speed reduction by a factor of 7.

The gear ratio (reduction ratio) between the output-side gear 71 and the input-side gear 72 is determined from the ratio between the number of steps of one rotation of the stepping motor 70 and the least common multiple calculated from the number of symbols displayed on the reel 3 and the number of steps of one rotation of the stepping motor 70.

Specifically, for example, when the number of steps of one rotation of the stepping motor 70 is "48" and the number of symbols displayed on the reels 3 is "21", the least common multiple of "48" and "21" is "336". The ratio between "48" that is the number of steps of one rotation of the stepping motor 70 and the least common multiple "336" is "48:336=1:7". Therefore, the gear ratio between the output-side gear 71 and the input-side gear 72 can be determined as "1:7×n (n is an integer)".

When the rotating speed of the reel 3 is 80 rpm and the gear ratio is 1:7 (n is 1 in the above), the speed of rotation of the stepping motor 70 is 1.33 rps. Therefore, when the number of steps per rotation of the stepping motor 70 is 48, the drive frequency of the stepping motor is 1.33 rps×"336" (described above)=448 pps.

The driving frequency is within a range of proper driving frequencies (about 300 to 500 pps) for the stepping motor 70 of two-phase excitation. When the above-described n is 2 or more, the driving frequency of the stepping motor 70 is 896 pps or more according to the similar calculation and is therefore out of the range of proper driving frequencies.

Therefore, the combination in which n is 1 (the rotating speed of 80 rpm, the gear ratio of 1:7, and the number of steps of 48) constitutes an optimum condition. That is, a proper reduction ratio is uniquely determined by a combination of "the least common multiple of the number of steps of one rotation of the stepping motor 70 and the number of symbols" and "the driving frequency of the stepping motor 70".

Figure 4:
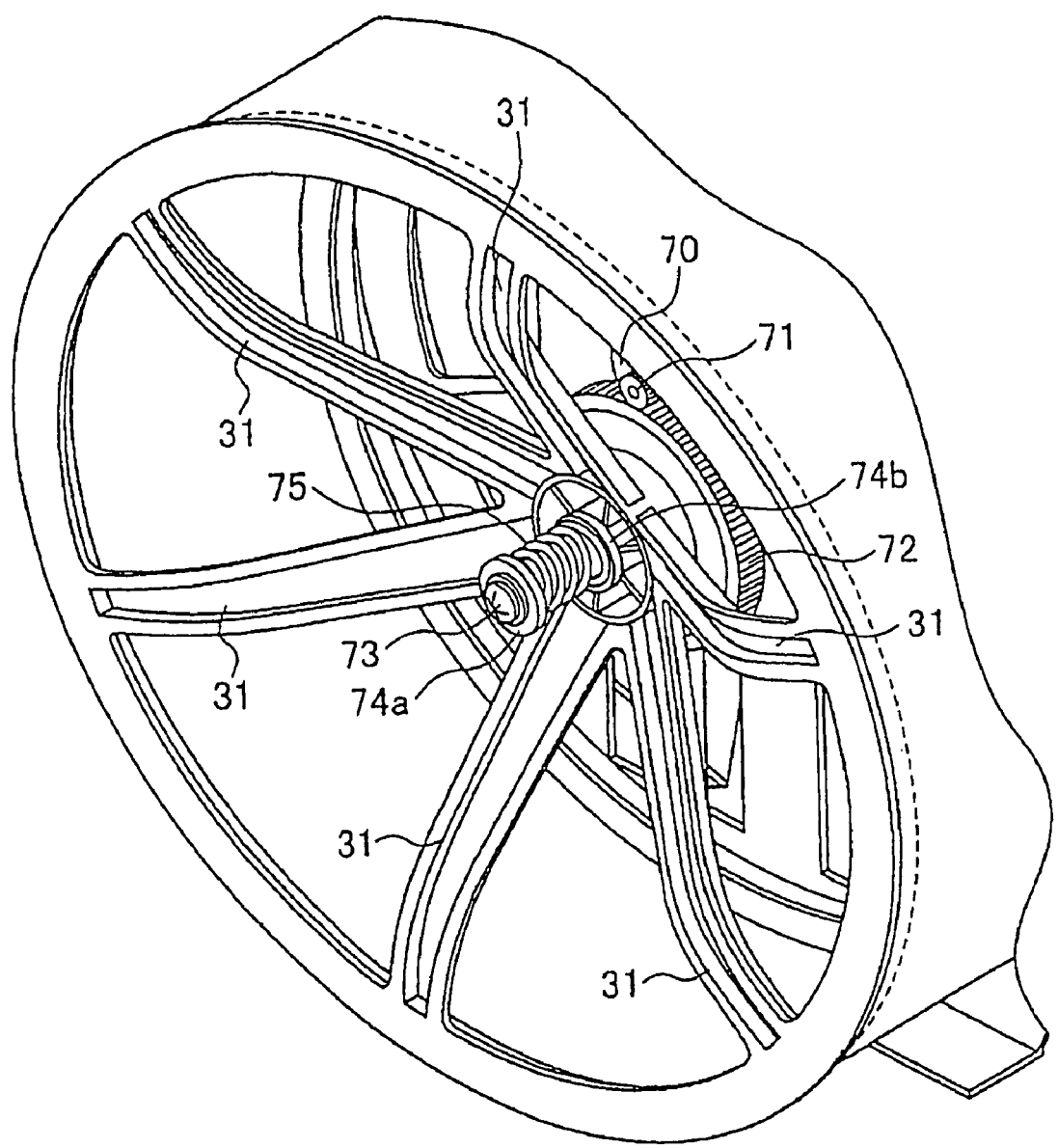
FIG. 4 shows a structure of the neighborhood of a center shaft of the embodiment.
Figure 6:
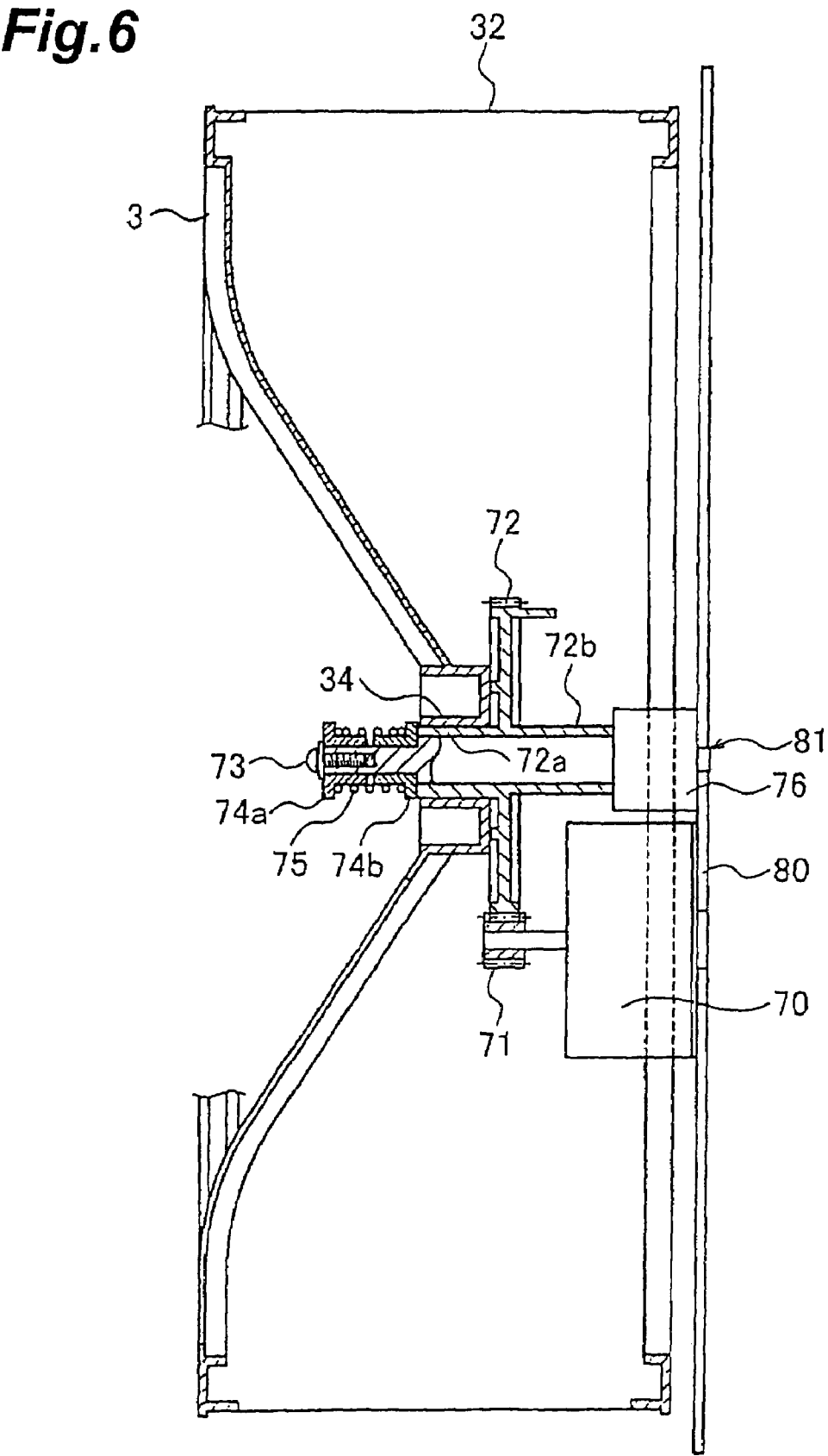
FIG. 6 is a sectional view showing a structure formed when the shaft supporting portion is mounted to a mounting plate.

FIG. 4 is a perspective view showing the neighborhood of the rotating shaft of the reel 3. FIG. 5(a) shows a structure of an axial support portion 720 for axially rotatably supporting the reel 3. FIG. 5(b) is a sectional view showing a structure for axially supporting the reel 3 with the axial support portion 720 fixed to the mounting plate 80. FIG. 6 is a sectional view showing the entire structure in which the axial support portion 720 axially supports the reel 3.

As shown in FIG. 5(a), the axial support portion 720 has a fastening member 73, collars 74a and 74b, a vibration-suppressing member 75, and a reel post 76. The reel post 76 has a rotational axial support portion 76a into which the input-side gear 72 is inserted to be rotatably axially supported thereby, a position fixing portion 76b for inserting a member for fixing the position of the reel 3, a protrusion 76c protruding from the bottom of the reel post 76 toward the mounting plate 80 for inserting and fitting the reel post 76 into a hole 81 in the mounting plate 80, threaded holes 76d for fixing the real post 76 to the mounting plate 80 with screws, and a fastening hole 76e for removal-stopping the input-side gear 72 using the fastening member 73 (which is a screw, for example) with the collars 74a and 74b and the vibration-suppressing member 75 interposed.

The vibration-suppressing member 75 provides a braking function during the rotation of the reel 3 under stop control effected by a main CPU 40 and damps any vibration of the reel 3 that occurs when the reel 3 stops rotating. The vibration-suppressing member 75 may be a spring. A spring 75 is used as the vibration-suppressing member 75 of this embodiment. As shown in FIG. 5(b), after the input-side gear 72 is inserted into the rotational axial support portion 76a, the spring 75 is inserted into the position fixing portion 76b in a state in which it is sandwiched between the collars 74a and 74b.

As shown in FIG. 5(b), the fastening member 73 is inserted into the fastening hole 76e for removal-stopping the collars 74a and 74b and the spring 75 inserted in the position fixing portion 76b. Because of the resilience of the spring 75, the spring 75 removal-stopped by the fastening member 73 urges the input-side gear 72 against the mounting plate 80 through the collar 74b. Thanks to a frictional force generated at this time, the vibration-suppressing member 75 can damp any vibration of the reel 3 occurring when the reel 3 stops rotating.

As shown in FIG. 6, the input-side gear has protrusions 72a and 72b that are integral therewith, the protrusions perpendicularly protruding from both sides of the gear in the form of a flat plate and having a cavity into which the rotational axial support portion 76a can be inserted along their perpendicular axes. The input-side gear 72 is inserted into the rotational axial support portion 76a with the protrusion 72b directed toward the mounting plate 80. The other protrusion 72a is press-fitted into a hole 34 provided at the center of the reel 3. Therefore, when the output-side gear 72 rotates, the reel 3 and the input-side gear rotate integrally with each other about the rotational axial support portion 76a.

Figure 7:
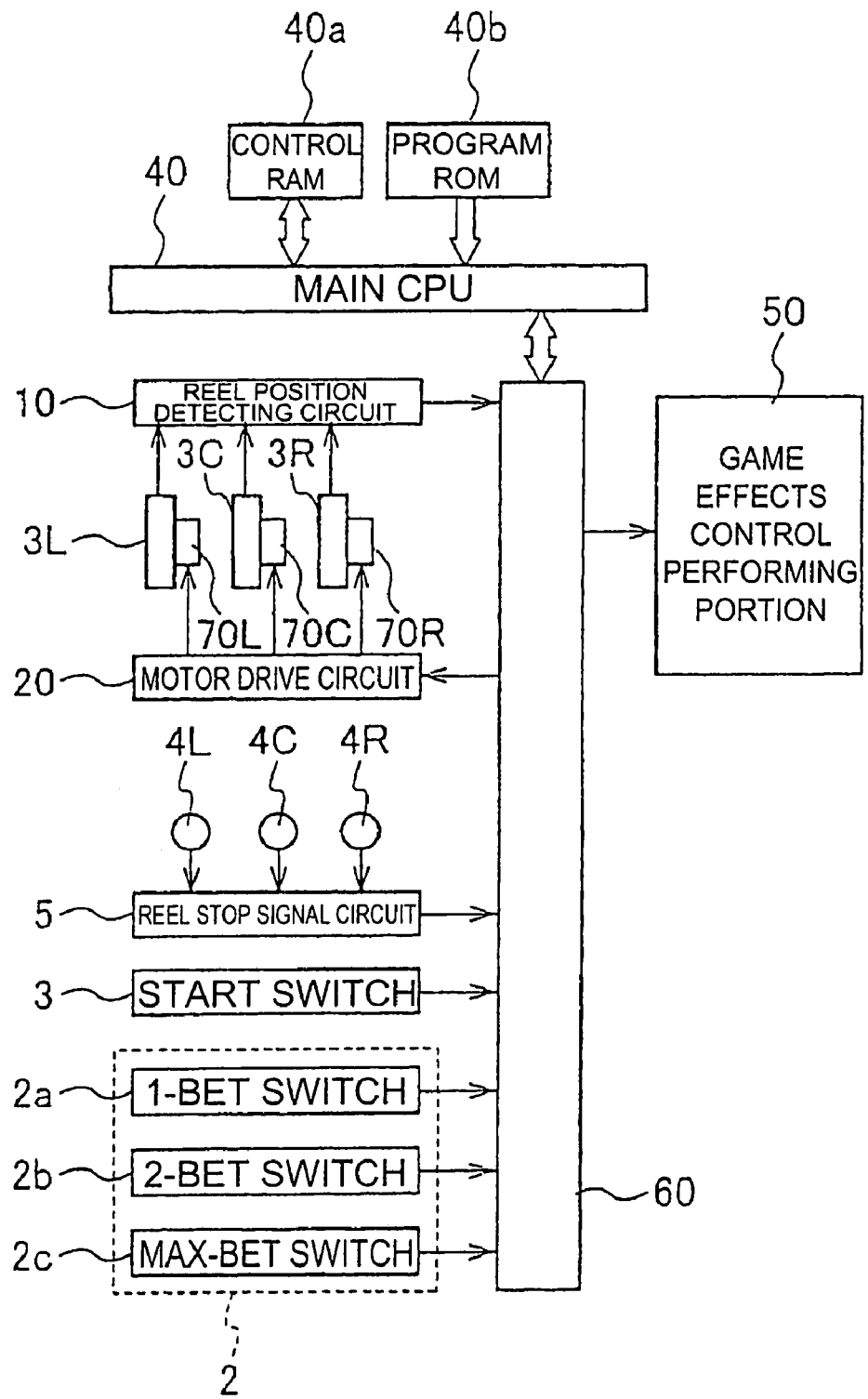
FIG. 7 shows an internal structure of the gaming machine of the embodiment.

FIG. 7 is a block diagram showing an electrical configuration of the rotating reel type gaming machine 1 including a motor stop control device. The motor stop control device has a stepping motor 70 having two pairs of excitation phases as a driving source of reels 3 displaying a plurality of symbols and stops the stepping motor 70 according to an operational instruction from the outside. A configuration corresponding to the motor control stop device corresponds to the configuration shown in FIG. 7.

As shown in FIG. 7, a microcomputer has a main CPU 40 (motor stop process means) which plays a primary role in control and calculations, a program ROM 40b in which programs and fixed data are stored, a control RAM 40a used for reading and writing data, and a random number generator (not shown) for generating predetermined random numbers.

Connected to the main CPU 40 through a bus 60 are input portions such as a start lever 9 for detecting an operation of the start lever 9, a reel stop signal circuit 12 for detecting operations of the stop buttons 4L, 4C and 4R, and BET switches 2a to 2c for betting credited medals through operations on push-buttons and output portions such as a motor drive circuit 20, a medal payout portion (not shown), and a game effects control performing portion 50.

The main CPU 40 reads and write data from and in the control RAM 40a according to a program stored in the program ROM 40b to control the operations of the input and output portions in conjunction with each other, and executes a lottery process using a random number generated by the random number generator. The game effects control performing portion 50 performs effects according to the lottery process based on a command from the main CPU 40.

The main CPU 40 internally performs the lottery process after detecting an operation of the start lever 9. The main CPU 40 performs the lottery process by sampling a predetermined random number generated by the random number generator and judging whether the sampled random number is within a predetermined range. No detailed description is given on the lottery process because it is publicly known.

When a stop process is thereafter performed with the stop buttons 4L, 4C and 4R, if the lottery has internally resulted in winning, the main CPU 40 executes stop control after lining up a predetermined symbol which has been won on a pay line. When the lottery has internally resulted in no winning, stop control is executed after performing a process of sliding the timing of the stop operation with the stop buttons 4L, 4C and 4R such that no predetermined winning symbol combination is enabled (this process is to slide a predetermined number of symbols).

A process is hereinafter referred to as "symbol process" when it includes the process of the main CPU 40 of lining up a predetermined symbol that has been won on a pay line and the process of the sliding a predetermined number of symbols such that no predetermined winning symbol combination is enabled.

The motor drive circuit 20 drives or stops the stepping motor 70 based on a command from the main CPU 40. In this embodiment, the motor drive circuit 20 performs a chopper operation to control a current flowing through a drive coil. The term "chopper operation" means repeatedly turning a current on and off at a high frequency. Thus, the motor drive circuit 20 can efficiently drive the rotor of the stepping motor 70 for rotation.

The stepping motor 70 is a four-phase motor having drive coils in A- to D-phases. In this embodiment, the phases are counterclockwise arranged in the order of A-, B-, C-, and D-phases. Further, the A- and C-phases or the B- and D-phases are paired, and a current flowing in one of two phases is opposite in phase to a current flowing in the other phase.

The motor drive circuit 20 sequentially drives the drive coils in the respective phases based on a command from the main CPU 40 to drive the rotor in the stepping motor 70 for rotation. When the stepping motor 70 is driven, a phase-shifted pulse is supplied form the main CPU 40 to a bipolar transistor (or a unipolar transistor) provided in each phase of the motor drive circuit 20.

While driving methods for a stepping motor include one-phase excitation, two-phase excitation, and "one-two phase excitation", this embodiment employs the two-phase excitation method in which drive coils in two phases are simultaneously excited. Two-phase (e.g., the C- and D-phase) excitation means that a current flows in two excitation phases such that magnetic fields are generated in the same direction in the two excitation phases among the two pairs of excitation phases. Stop control relying upon the two-phase (e.g., the C- and D-phases) excitation provides a braking force higher than those achievable with full-phase excitation, one-phase excitation, and three-phase excitation.

For example, a PM type stepping motor-having 48 steps per rotation or a rotational angle of 7.5 deg per step is used as the stepping motor 70 of this embodiment.

FIG. 8 shows the contents of a reel stopping process performed by the moment when the reel 3 is finally stopped. As shown in FIG. 8, the reel stopping process includes a "stopping process" representing a process since a press on any of the stop buttons 4 until a holding is started and a "holding process" representing a process until the reel 3 is completely stopped after the end of the "stopping process".

The "stopping process" shown in FIG. 8 includes a "symbol process" for performing the process of the main CPU 40 of lining up a predetermined symbol that has been won on a pay line or the process of the main CPU 40 of sliding a predetermined number of symbols such that no predetermined winning symbol combination is enabled, the symbol process being performed after the stop button 4 is pressed until the reel 3 comes close to a target stop position. The stopping process also includes a "decelerating process" for performing a control process to decelerate the rotating speed of the stepping motor 70 to stop the same after the end of the "symbol process" until the reel 3 is stopped at the target stop position. The "deceleration process" according to this embodiment employs two-phase (e.g. the B- and C-phases) excitation.

The "holding process" includes an "excitation process" representing a process of exciting each phase to stop the stepping motor 70 (stop control) and a "vibration-suppressing effect by a vibration-suppressing member 75" representing damping of any vibration of the reel 3 occurring when the stepping motor 70 stops rotating by the use of a vibration-suppressing member 75.

As shown in FIG. 8, the reel stopping process including the "stopping process" and the "holding process" includes a "common reel stopping process", a "first reel stopping process", a "second reel stopping process", and a "third reel stopping process". Those reel stopping processes will be described below in the order listed.

(1) Common Reel Stopping Process

FIG. 9 shows the contents of the common reel stopping process. FIG. 9(a) shows pulses in each phase transmitted from the main CPU 40 to the motor drive circuit 20 during the "stopping process" and the "holding process". FIG. 9(b) shows the rotating speed of the reel 3 relative to time measured when the motor drive circuit 20 drives the stepping motor 70 based on the pulses in each phase received from the main CPU 40. The time shown in FIG. 9(b) according to this embodiment corresponds to the time shown in FIG. 9(a). The "common reel stopping process" means a reel stopping process which has been conventionally performed.

The two dotted lines shown in FIG. 9(b) indicate a range within which an actual stopping position can vary. An actual stopping position is determined by balance between the detent torque of the stepping motor 70 and the inertia of the reel 3. Therefore, the actual stopping position varies depending on the balance. Since the balance is artificially adjusted, an increase in manufacturing cost occurs. The variation of the "actual stopping position" is substantially 0 in the "first through third reel stopping processes" because they employ the "deceleration process", "excitation process" or "vibration-suppressing effect by the vibration-suppressing member 75".

As shown in FIGS. 9(a) and (b), the "common reel stopping process" means that the "symbol process" is performed after the stop button 4 is pressed and that the "excitation process" is performed on a full-phase excitation basis to stop the reel 3. As shown in FIG. 8, the "common reel stopping process" does not involve the "deceleration process" and the "vibration-suppressing effect by the vibration-suppressing member 75" involved in the first through third reel stopping processes. The "common reel stopping process" does not involve the deceleration transmission mechanism 700 but involves a driving mechanism provided by the stepping motor 70 according the direct driving method.

As shown in FIG. 9(a), interrupt processes are performed in the "common reel stopping process" at time intervals of, for example, 1.8773 ms. The time intervals between the interrupt processes are determined by the driving frequency of the stepping motor 70. The driving frequency S of the stepping motor 70 can be expressed by a relational expression "S=(the number of rotations per second of the reel 3)×(the number of steps per rotation of the stepping motor 70)".

For example, let us assume that, in this embodiment, the number of rotations per second of the reel 3 is 80 rpm/60 sec; the number of steps per rotation of the stepping motor 70 is 200; and one-two phase excitation is used as the excitation method. Then, the number of steps per rotation is 400, and the driving frequency S of the stepping motor 70 is 533 pps from the above relational expression.

A vibration period T that is 1/S therefore becomes 1.875 ms. Since the vibration period T (1.875 ms) is a value near a minimum clock period (e.g., 1.2 ms) used in the main CPU 40 (vibration period T>clock period), the interrupt processes are performed at the time intervals of 1.875 ms.

As apparent from FIG. 9, the maximum number of interrupts since a press on the stop button 4 until the completion of the stopping process can be obtained from the following relational expression. However, since symbols on the reel 3 are shown in twenty-one frames and the number of steps per rotation of the stepping motor 70 is 400, the number of steps per frame is 400 steps/21 frames=19.05 which is not an integer. It is therefore impossible to allocate equal numbers of steps to the twenty-one frames, and the 400 steps are formed into {19 steps×20 frames+20 steps×1 frame}. One step corresponds to one interrupt according to the above relational expression for the vibration period T.

Therefore, a common maximum number of interrupts is 1 (the number of interrupt required for detecting a stop button) +18 (maximum waiting time=19 steps −1)+4 (maximum slides of 4 frames)×19 (steps)+5 (the number of interrupts used for adjusting the position of the reel 3)=100 interrupts.

Therefore, the maximum time between a press on the stop button 4 and the completion of the stopping process is 100 (interrupts)×1.875 ms (interrupt time interval)=about 187.73 ms. Thus, the "stopping process" of by the main CPU 40 is performed within about 190 ms, as shown in FIG. 9. After the "stopping process" is completed, as shown in FIG. 9, the main CPU 40 performs stop control on a full-phase excitation (all phases ON) basis for about 375 ms (200 (interrupts) ×1.875 ms).

As shown in FIG. 9, the stepping motor 70 needs a braking time Δt which is actually measured at about 100 ms. Since the full-phase excitation is equivalent to non-excited state, only detent torque Td of the stepping motor 70 constitutes load torque at this braking process.

Therefore, the detent torque Td is given by J·ω/Δt and where Δt represents the braking time after the completion of the stopping process until stopping at an anticipated position and where J represents a moment of inertia that is momentum generated at the rotating shaft of the reel 3, and the braking time Δt is given by J·ω/Td.

As shown in FIG. 8, the braking time Δt in the conventional "common reel stopping process" is longer than a braking time in the "first reel stopping process", the "second reel stopping process" or the "third reel stopping process" according to the invention because the rotating shaft of the stepping motor 70 is directly fitted into the reel 3 in the middle thereof and because the "deceleration process" and the "vibration-suppressing effect by the vibration-suppressing member 75" according to this embodiment are not involved. The "first reel stopping process", the "second reel stopping process", and "the third reel stopping process" will be described below in the order listed.

(2) First Reel Stopping Process

Figure 10:
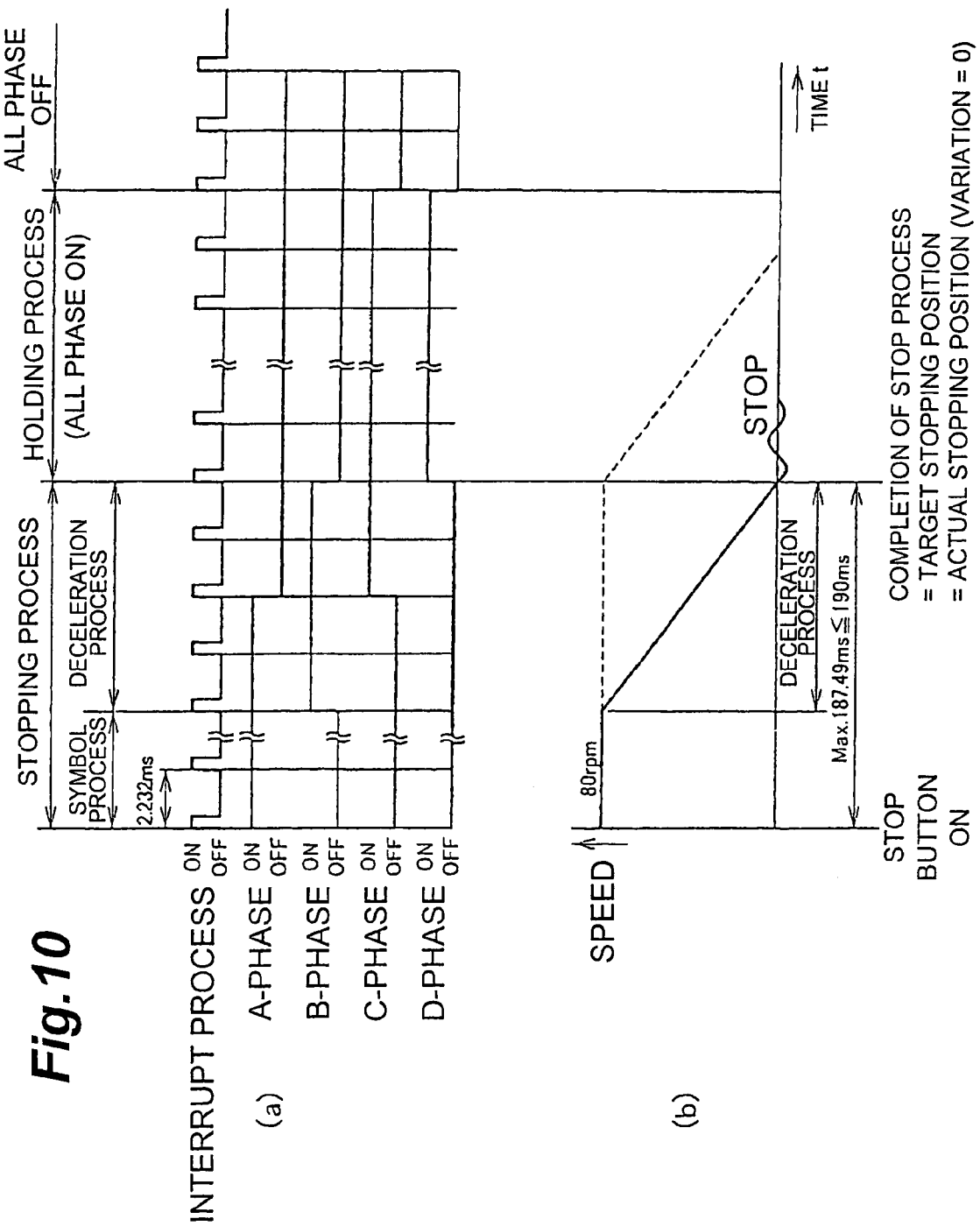
FIG. 10 shows the contents of a "first reel stopping process" of the embodiment.

FIG. 10 shows the contents of the "first reel stopping process". FIG. 10(a) shows pulses in each phase transmitted from the main CPU 40 to the motor drive circuit 20 during the "stopping process" and the "holding process". FIG. 10(b) shows the rotating speed of the reel 3 relative to time measured when the motor drive circuit 20 drives the stepping motor 70 based on the pulses in each phase received from the main CPU 40.

The time shown in FIG. 10(b) according to this embodiment corresponds to the time shown in FIG. 10(a). The part indicated by the dotted line in FIG. 10(b) represents the rotating speed of the reel in FIG. 9(b). The "completion of the stopping process" shown in FIG. 10(b) substantially coincide with the "target stopping position" and the "actual stopping position" shown in FIG. 9(b), as will be described later in detail. This equally applies to the "completion of the stepping process" shown in FIGS. 11(b) and 12(b).

In this embodiment, the "first reel stopping process" means the execution of control by the main CPU 40 to decelerate the stepping motor 70 to a rotating speed lower than its rotating speed during constant speed rotation when a stop command for the stepping motor 70 is generated according to an operational instruction from the outside and the execution of stop control by the main CPU 20 over the stepping motor 70 on a two-phase excitation basis.

Specifically, in the "first reel stopping process", as shown in FIGS. 10(a) and (b), the main CPU 40 performs the "symbol process" after a press on the stop button 4; the main CPU 40 then performs the "deceleration process"; the main CPU 40 thereafter performs the "excitation process" through two-phase excitation; and the reel 3 is thereafter stopped. The "first reel stopping process" includes "the deceleration process" and the "excitation process (two-phase excitation)" which are not included in the "common reel stopping process" as shown in FIG. 8.

As shown in FIG. 10(a), interrupt processes according to this embodiment are different from those in the "common reel stopping process" in that they are performed at time intervals of, for example, about 2.232 ms. The time intervals between the interrupt processes can be determined in relation to the driving frequency of the stepping motor 70. A driving frequency S of the stepping motor 70 at a constant speed can be expressed by a relational expression "S=(the number of rotations per second of the reel 3)×(the number of steps per rotation of the stepping motor 70)".

For example, let us assume that the "number of rotations per second of the reel 3" is 80 rpm/60 sec ×7 (reduction ratio); the number of steps per rotation of the stepping motor 70 is 48; two phase excitation is used as the excitation method; and the reduction ratio is 1:7. Then, the driving frequency S of the stepping motor 70 is 448 pps.

The vibration period T that is 1/S therefore becomes 2.232 ms. Since the vibration period T (2.232 ms) is a value near the minimum clock period (e.g., 1.2 ms) used in the main CPU 40 (vibration period T>clock period), the interrupt processes are performed at the time intervals of 2.232 ms. Interrupt processes in the "second reel stopping process" and the "third reel stopping process" to be described later are also performed at similar time intervals.

In the "first reel stopping process", as shown in FIG. 10(b), the "deceleration process" is performed in the period (about 190 ms) from the press on the stop button 4 until the stopping process is completed. At the "deceleration process", the main CPU 40 transmits a command for reducing a constant rotating speed (e.g., 80 rpm) of the reel 3 to a predetermined rotating speed (e.g., 40 rpm) to the motor drive circuit 20 for a time corresponding to a predetermined number of interrupts.

Specifically, as shown in FIG. 10, the main CPU 40 transmits pulses for causing two-phase excitation in a number corresponding to predetermined time intervals as a command for reducing the constant rotating speed (e.g., 80 rpm) of the reel 3 to the predetermined rotating speed (e.g., 40 rpm). Upon receipt of the pulses for causing two-phase excitation, the motor drive circuit 20 excites, for example, the B- and C-phases based on the received pulses to reduce the rotating speed of the rotor (to 40 rpm, for example).

When the "deceleration process" is completed, the main CPU 40 performs stop control (excitation process) through two-phase excitation. In the "excitation process" through two-phase excitation, as shown in FIG. 10(a), the main CPU 40 transmits pulses for exciting, for example the C- and D-phases to the motor drive circuit 20 after the "deceleration process" is terminated. The motor drive circuit 20 excites, for example, the C- and D-phases for a predetermined time intervals based on the received pulses. The stepping motor 70 is completely stopped when "excitation process" continues for the predetermined time interval.

Since the deceleration transmission mechanism 700 according to this embodiment has a reduction ratio of "1:n" (e.g., n=7), moment of inertia J' generated during the rotation of the reel 3 has a value that is the moment of inertia J without the deceleration transmission mechanism 700 divided by the value n of the reduction ratio (J/n).

Therefore, detent torque Td1 at the "first reel stopping process" is one n-th of the detent torque Td at the "common reel stopping process" {Td1=Td/n=(J/n)·ω/Δt}. Thus, a braking time Δt1 at the "first reel stopping process" also has a value reflecting a reduction by the value n of the reduction ratio "1:n" {Δt=(J/n)·ω/Td1}.

This equally applies to the "second reel stopping process" and the "third reel stopping process" to be described later in that detent torque Td2 and Td3 and braking times Δt2 and Δt3 at the respective processes are reduced according to relational expressions similar to those for the detent torque Td1 and the braking time Δt1 described above.

Therefore, the "first reel stopping process", the "second reel stopping process", and the "third stopping process" can reduce the magnitude of detent torque from that in the "common reel stopping process", and the braking time can be also reduced from that in the "common reel stopping process".

(3) Second Reel Stopping Process

Figure 11:
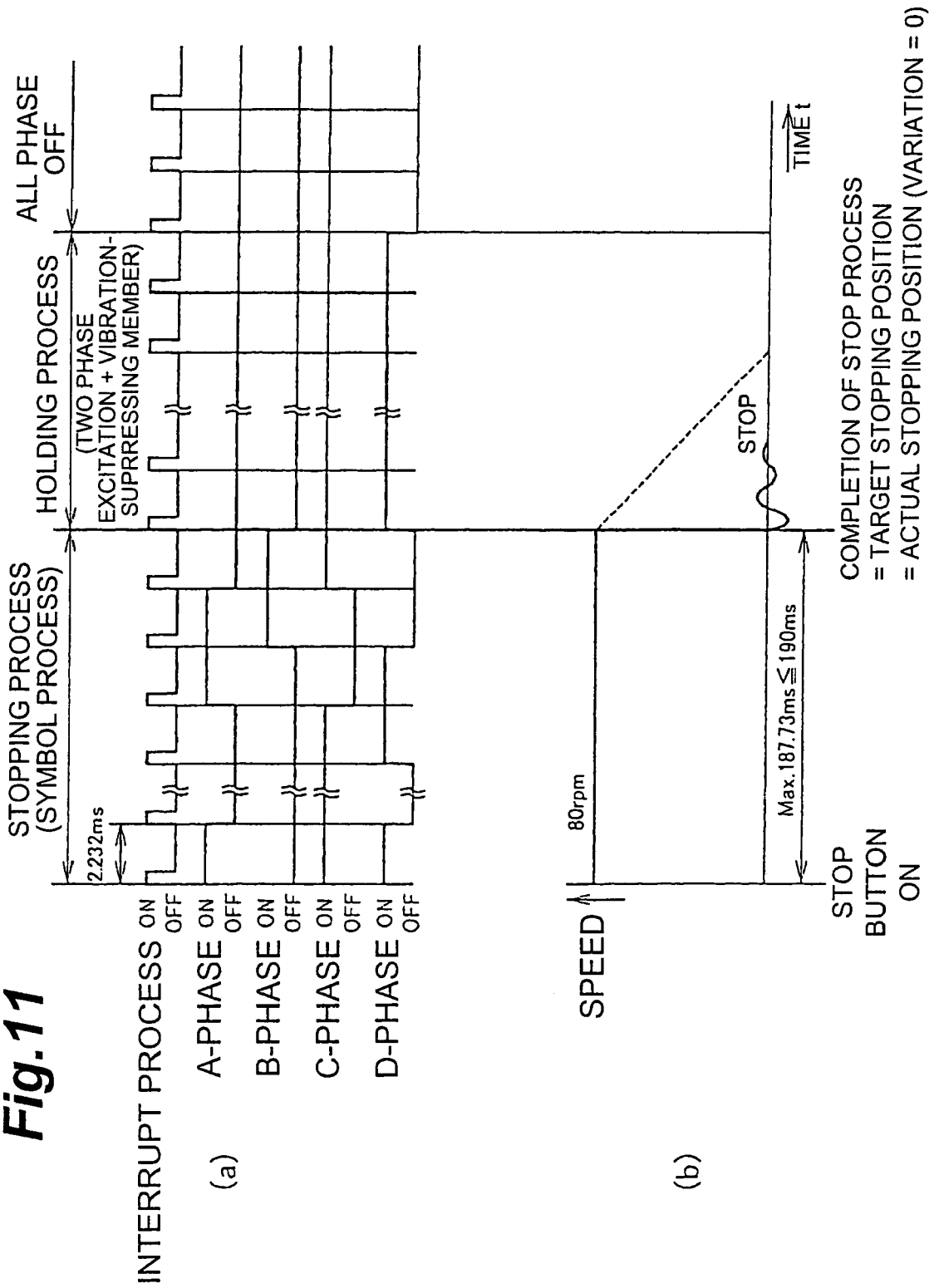
FIG. 11 shows the contents of a "second reel stopping process" of the embodiment.

FIG. 11 shows the contents of the "second reel stopping process". FIG. 11(a) shows pulses in each phase transmitted from the main CPU 40 to the motor drive circuit 20 during the "stopping process" and the "holding process". FIG. 11(b) shows the rotating speed of the reel 3 relative to time measured when the motor drive circuit 20 drives the stepping motor 70 based on the pulses in each phase received from the main CPU 40. The time shown in FIG. 11(b) according to this embodiment corresponds to the time shown in FIG. 10(a). The part indicated by the dotted line in FIG. 11(b) represents the rotating speed of the reel in FIG. 9(b).

The "second reel stopping process" means the execution of stop control by the main CPU 40 on the stepping motor 70 through two-phase excitation (e.g., the C- and D-phases) when a stop command for the stepping motor 70 is generated according to an operational instruction from the outside, and the damping of vibration of the reel 3 occurring when the reel 3 stops rotating performed by the vibration-suppressing member 75.

Specifically, in the "second reel stopping process", as shown in FIGS. 11(a) and (b), the "symbol process" is performed after a press on the stop button 4; the "excitation process" through two-phase excitation is then performed; "the vibration-suppressing effect by the vibration-suppressing member 75" is then exerted; and the reel 3 is thereafter stopped. The "second reel stopping process" includes "vibration-suppressing effect by the vibration-suppressing member 75" which is not included in the "common reel stopping process" as shown in FIG. 8 and also includes the "excitation process" through two-phase excitation.

Although the "second reel stopping process" does not include the "deceleration process" in the "first reel stopping process as shown in FIG. 8, the "vibration-suppressing effect by the vibration-suppressing member 75" is exerted. The "vibration-suppressing effect" by the vibration-suppressing member 75" means damping of any vibration of the reel 3 occurring when the reel 3 stops rotating by the use of the vibration-suppressing means 75.

Thus, a braking time Δt2 and detent torque Td2 of the reel 3 at the "second reel stopping process" can be smaller than the braking time Δt and the detent torque Td at the "common reel stopping process" similarly to the braking time Δt1 and the detent torque Td1 at the "first reel stopping process".

(4) Third Reel Stopping Process

Figure 12:
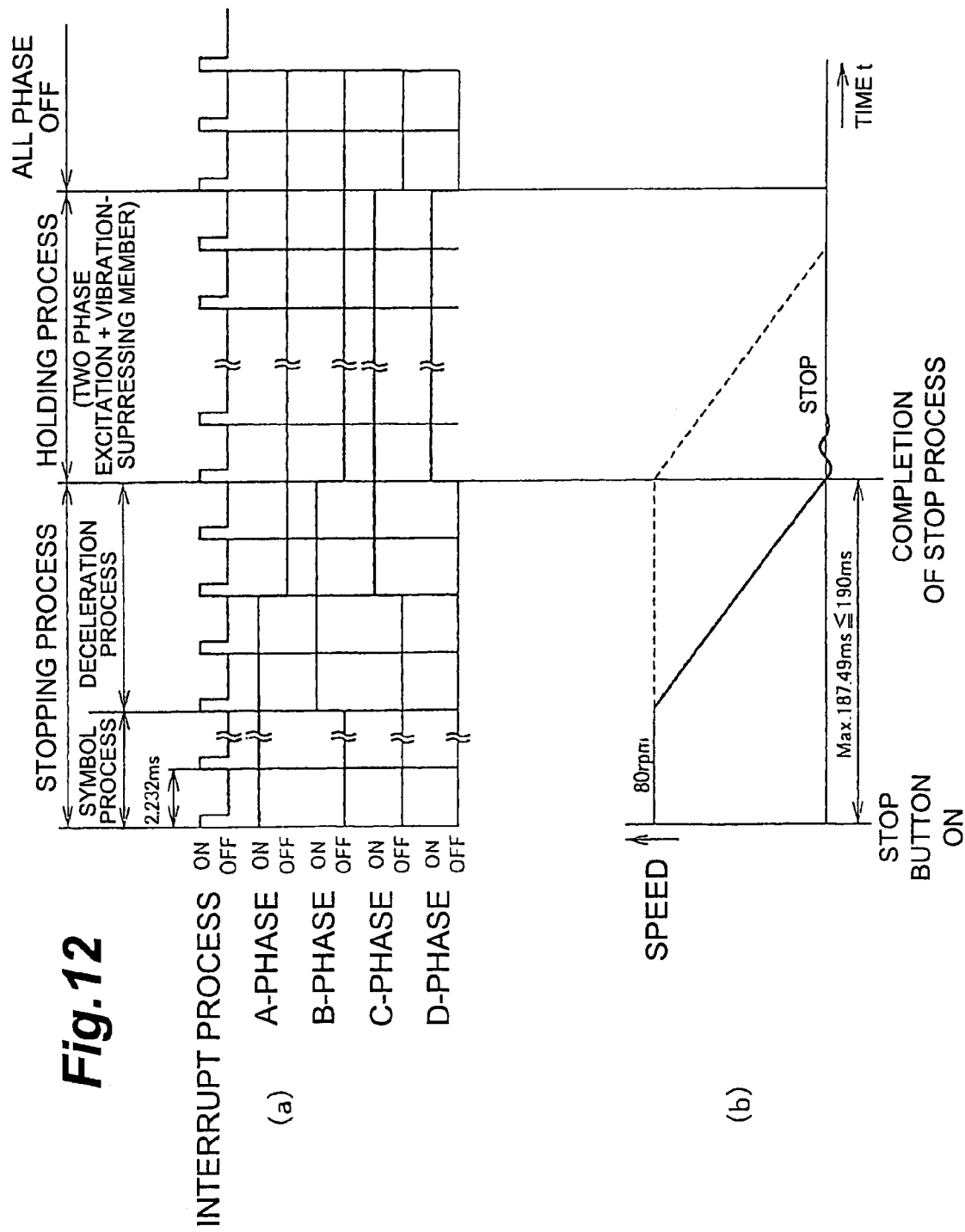
FIG. 12 shows the contents of a "third reel stopping process" of the embodiment.

FIG. 12 shows the contents of the "third reel stopping process". FIG. 12(a) shows pulses in each phase transmitted from the main CPU 40 to the motor drive circuit 20 during the "stopping process" and the "holding process". FIG. 12(b) shows the rotating speed of the reel 3 relative to time measured when the motor drive circuit 20 drives the stepping motor 70 based on the pulses in each phase received from the main CPU 40. The time shown in FIG. 12(b) according to this embodiment corresponds to the time shown in FIG. 12(a). The part indicated by the dotted line in FIG. 12(b) represents the rotating speed of the reel in FIG. 9(b).

The "third reel stopping process" means the execution of control by the main CPU 40 to decelerate the stepping motor 70 to a rotating speed lower than its rotating speed during constant speed rotation when a stop command for the stepping motor 70 is generated according to an operational instruction from the outside; the execution of stop control by the main CPU 40 over the stepping motor 70 through two-phase excitation (e.g., the C- and D-phases); and subsequent damping of any vibration of the reel 3 occurring when the reel 3 stops rotating by the vibration-suppressing member 75.

Specifically, in the "third reel stopping process", as shown in FIGS. 12(a) and (b), the "symbol process" is performed after a press on the stop button 4; the "deceleration process" is performed; "excitation process" through two-phase excitation is thereafter performed; and "the vibration-suppressing effect by the vibration-suppressing member 75" is then exerted and the reel 3 is stopped.

The "third reel stopping process" includes the "vibration-suppressing effect by the vibration-suppressing member 75" which is not included in the "common reel stopping process" and also includes the "deceleration process" and the "excitation process" through two-phase excitation which are not performed in the "common reel stopping process". The processes will not be detailed here because the description will be similar to those presented above.

Thus, a braking time $\Delta t3$ and detent torque Td3 of the reel 3 at the "third reel stopping process" can be smaller than the braking time $\Delta t$ and the detent torque Td at the "common reel stopping process" similarly to the braking time and the detent torque at each of the "first reel stopping process" and the "first reel stopping process".

(5) Actually Measured Waveforms

Figure 13:
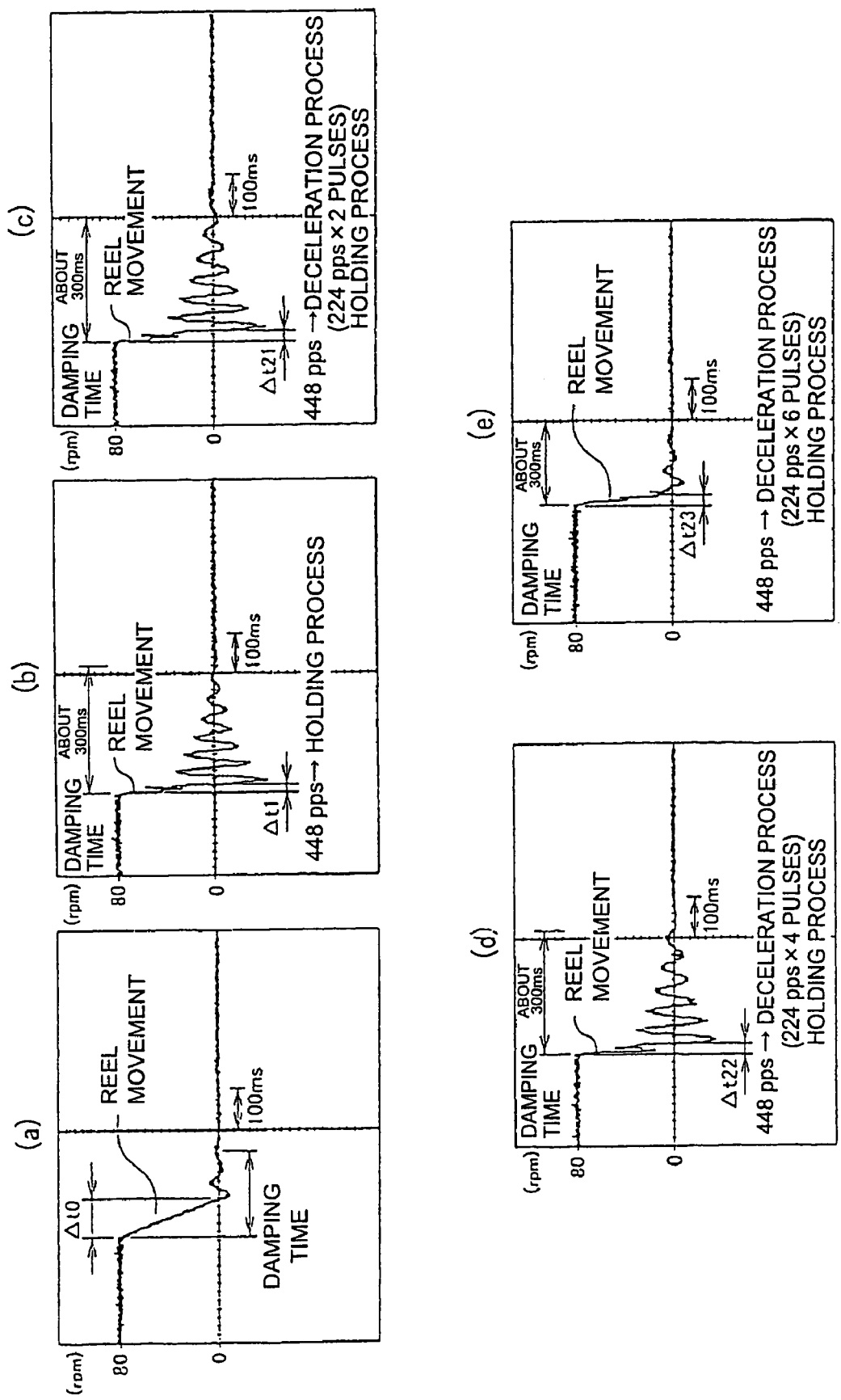
FIG. 13, consisting of FIG. 13(*a*) to 13(*c*), is showing waveforms actually measured at a reel stopping process of the embodiment.

FIG. 13(a) is an actually measured waveform indicating the rotating speed of the reel 3 relative to time during the execution of the "common reel stopping process" (refer to FIG. 8). FIG. 13(b) is not a waveform actually measured at any of the "first reel stopping process" through the "third reel stopping process" but is an actually measured waveform indicating the rotating speed of the reel 3 relative to time taken when only the "excitation process through two-phase excitation" is performed. FIGS. 13(c) to (e) are actually measured waveforms indicating the rotating speed of the reel 3 relative to time taken when the "first reel stopping process" is performed.

The "448 pps→deceleration process (224 pps×2 pulses) →holding process" shown in FIG. 13(c) means that a "symbol process" including interrupt processes at intervals of 2.232 ms (the period of a driving frequency of 448 pps) is performed; a "deceleration process" including interrupt processes at 2.232 ms×4 (twice the period of a driving frequency of 224 pps) is performed; and a "holding process" is thereafter performed. The arrows in FIGS. 13(b) and (e) represent flows similar to that in FIG. 13(c).

A comparison between the waveform actually measured at the "common reel stopping process" shown in FIG. 13(a) and the waveform actually measured at the solely performed "excitation process through two-phase excitation" shown in FIG. 13(b) indicates that a braking time $\Delta t1$ shown in FIG. 13(b) (the time after the execution of the excitation process until the reel 3 reaches a target stopping position; this equally applies to the following description) is obviously shorter than $\Delta t0$ shown in FIG. 13(a). Similarly, a comparison between the waveform actually measured at the "common reel stopping process" shown in FIG. 13(a) and the waveforms actually measured at the "first reel stopping process" shown in FIGS. 13(c) to 13(e) indicates that braking times $\Delta t21$, $\Delta t22$, and $\Delta t23$ shown in FIGS. 13(c) to 13(e) are obviously shorter than $\Delta t0$ shown in FIG. 13(a). Thus, the "excitation process through two-phase excitation" according to this embodiment can obviously achieve a braking time that is shorter than that achievable with the "excitation process through full-phase excitation" included in the "common reel stopping process".

A comparison between the waveform actually measured at the solely performed "excitation process through two-phase excitation" shown in FIG. 13(b) and the waveforms actually measured at the "first reel stopping process" shown in FIGS. 13(c) to 13(e) indicates that the vibrational amplitudes of the reel 3 shown in FIGS. 13(c) to 13(e) are smaller than the vibrational amplitude of the reel 3 shown in FIG. 13(b). Thus, the execution of the "deceleration process" according to the embodiment allows the vibrational amplitude of the reel 3 to be damped more effectively than a stopping process which does not involve this process.

A comparison between the actually measured waveforms shown in FIGS. 13(c) to (e) indicates that the vibrational amplitude of the reel 3 becomes smaller and the damping time of the vibrational amplitude of the reel 3 becomes shorter (from about 300 ms to about 210 ms), as the processing time of the "deceleration process" becomes longer (FIG. 13(c)→FIG. 13(d)→FIG. 13(e)). Therefore, the vibrational amplitude of the reel 3 can be made smaller more effectively and the damping time of the vibrational amplitude of the reel 3 can be made shorter, the longer the processing time of the "deceleration process".

FIGS. 14(a) and (b) are actually measured waveforms indicating rotating speeds of the reel 3 relative to time taken during the execution of the "second reel stopping process" and the "third reel stopping process", respectively. Urging forcing applied to the reel 3 in FIGS. 14(a) and (b) are 200 gf and 100 gf, respectively. The urging forces applied to the reel 3 mean loads applied to the reel 3 by the vibration-suppressing member 75 through the "vibration-suppressing effect by the vibration-suppressing member 75".

The "448 pps→holding process" shown in FIG. 14(a) means that a "symbol process" including interrupt processes at intervals of 2.232 ms (the period of a driving frequency of 448 pps) is performed and that a "holding process" is thereafter performed. The "448 pps→deceleration process (224 pps×2 pulses)→holding process" shown in FIG. 14(b) means that a "symbol process" including interrupt processes at intervals of 2.232 ms (the period of a driving frequency of 448 pps) is performed; a "deceleration process" including interrupt processes at 2.232 ms×4 (twice the period of a driving frequency of 224 pps) is performed; and a "holding process" is thereafter performed.

It will be understood that the damping time of the vibrational amplitude of the reel 3 at the "second reel stopping process" shown in FIG. 13(a) (448 pps→holding process) having an urging force (200 gf) to the reel 3 is shorter than the damping time achieved only by the "excitation process through two-phase excitation" shown in FIG. 13(b) (448 pps→holding process) having no urging force to the reel 3 (the damping time in FIG. 14(a) is about 80 ms whereas the damping time in FIG. 13(b) is about 320 ms). Therefore, the "second reel stopping process" can achieve a damping time shorter than the damping time achieved only by the "excitation process through two-phase excitation" shown in FIG. 13(b) to suppress vibration of the reel 3 more effectively without the deceleration process at the "first reel stopping process".

It will be understood that the damping time of the vibrational amplitude of the reel 3 at the "third reel stopping process" (shown in FIG. 14(b)) (448 pps→deceleration process (224 pps×2 pulses)→holding process) having an urging force (100 gf) to the reel 3 is shorter than the damping time achieved by the "first reel stopping process" shown in FIG. 13(c) (448 pps→deceleration process (224 pps×2 pulses)→holding process) which involves the same deceleration process but has no urging force to the reel 3 (the damping time in FIG. 14(b) is about 80 ms whereas the damping time in FIG. 13(c) is about 300 ms). Therefore, the "third reel stopping process" can achieve a further reduction of the damping time from the damping time at the "first reel stopping process" shown in FIG. 13(c) which achieves a reduction of the damping time only insufficiently because the processing time of the deceleration process is short, the process thereby allowing vibration of the reel 3 to be more efficiently suppressed.

In the "third reel stopping process" shown in FIG. 14(b), since the "deceleration process" is added to the processes in the "second reel stopping process" as shown in FIG. 8, a reduction in damping time similar to that in FIG. 14(a) can be achieved even if the urging force to the reel 3 is smaller than that in the "second reel stopping process" shown in FIG. 14(a), which makes it possible to suppress vibration of the reel 3 more effectively.

(Reel Stop Control Method of the Motor Stop Control Device)

Figure 15:
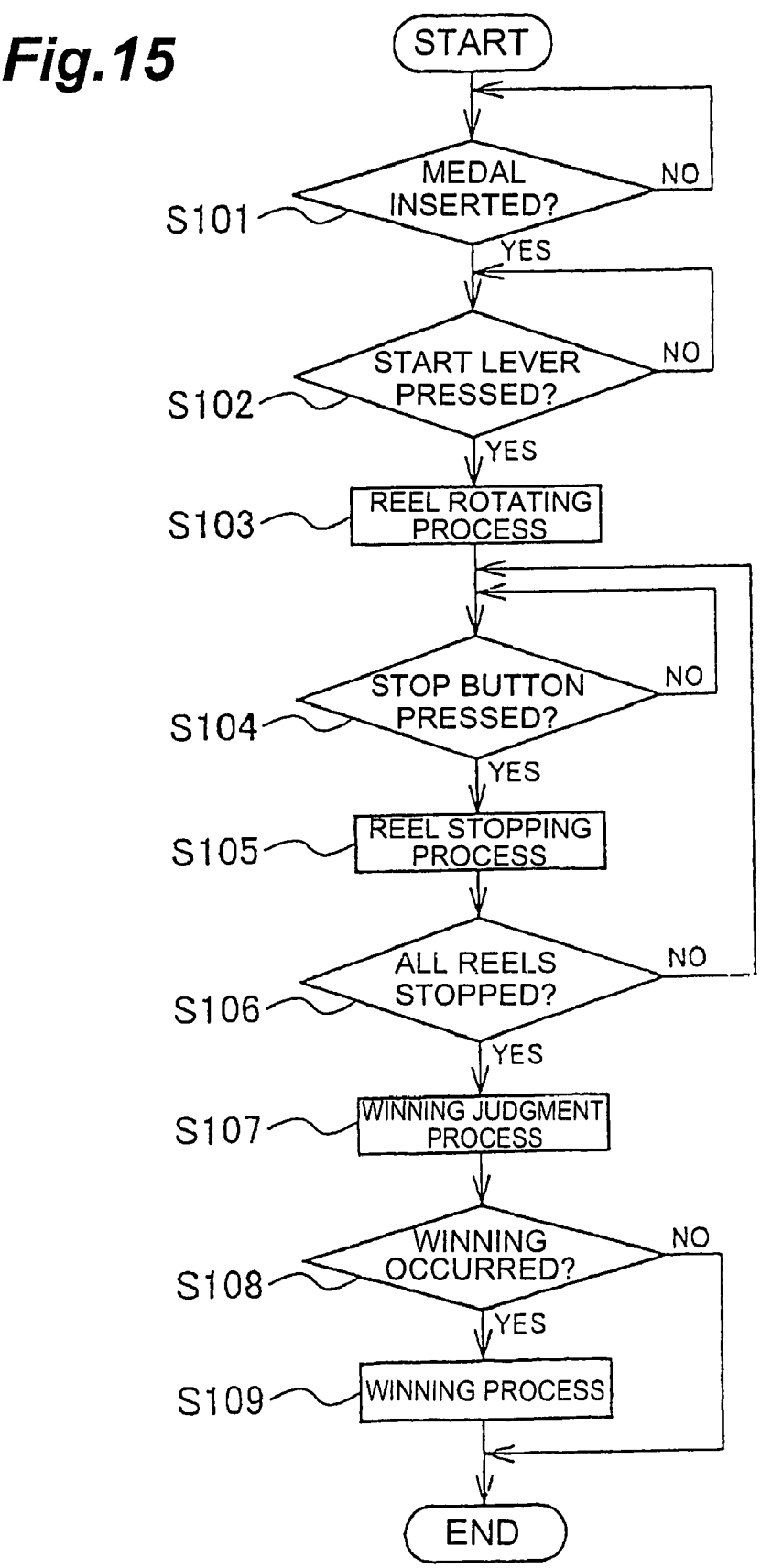
FIG. 15 shows a flow of the reel stop control method of the embodiment.

A reel stop control method of the motor stop control device having the above-described configuration can be carried out according to the following procedure. FIG. 15 shows a flow of control effected by the motor stop control device.

As shown in FIG. 15, when a medal is inserted into the insertion slot 7 by a player or when a BET switch 2 is pressed, the process at S101 results in "YES", and the main CPU 40 monitors whether the start lever 9 has been operated or not (S102). When the player operates the start lever 9, the main CPU 40 executes a process of rotating the three stepping motors 70 simultaneously (S103).

Figure 16:
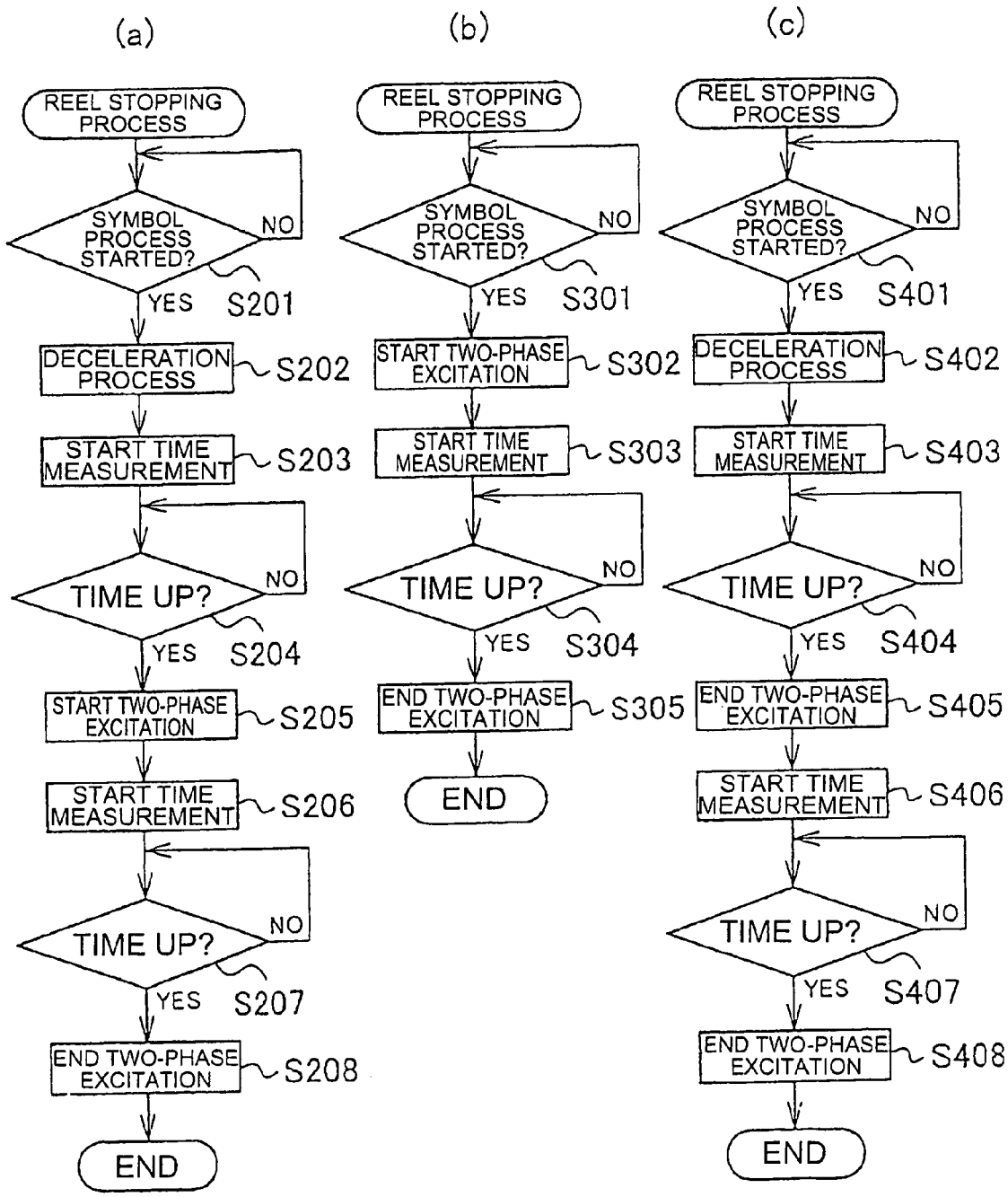
FIG. 16, consisting of FIG. 16(*a*) to 16(*c*), is showing a flow of the reel stopping process of the embodiment.

When the player then presses any of the stop buttons 4, the process at S104 results in "YES", and the main CPU 40 executes a reel stopping process according to the procedure shown in FIG. 16 (S105). When all of three reels 3 stop, the main CPU 30 executes a winning judgment process (S106 and S107).

When winning is thereafter judged to have occurred, the process at S108 results in "YES", and the main CPU 40 performs a winning process (e.g., effect control for displaying a predetermined image on the screen or lamp control for sequentially turning on a plurality of lamps in a predetermined sequence) (S109). When no winning has occurred, the process at S108 results in "NO", and the main CPU 40 terminates the procedure without executing the process at S109.

FIG. 16 is a flow showing details of S105 in FIG. 15. FIG. 16(a) shows a flow of the above-described "first reel stopping process". A "deceleration process" according to this embodiment employs two-phase excitation.

As shown in FIG. 16(a), the main CPU 40 stands by for the start of a "symbol process". When the stop button 4 is operated by the player, after the process of lining up the predetermined symbol which has been internally won on a pay line is performed, the main CPU performs a deceleration process to reduce the rotating speed of the reels that are rotating at a constant speed (e.g., 80 rpm) to a lower rotating speed (e.g., 40 rpm), the deceleration process being performed according to an operation of the player on the stop button 4 when the lining-up process is not performed (S202).

During the deceleration process, the main CPU 40 outputs pulses for achieving the rotating speed lower than the constant rotating speed to the motor drive circuit 20.

At this time, the main CPU 40 measures the duration of the deceleration process (S203). When a predetermined time passes, the process at S204 results in "YES", and the main CPU 40 terminates the deceleration process and executes an excitation process (stop control) through two-phase excitation (e.g., the C- and D-phases) through the motor drive circuit 20 (S205).

The main CPU 40 then measures the duration of the excitation process through two-phase excitation (S206). When a predetermined time passes, the process at S207 results in "YES", and the main CPU 40 terminates the excitation process through two-phase excitation (stop control) through the motor drive circuit 20 (S208).

FIG. 16(b) shows a flow of the above-described "second reel stopping process". As shown in FIG. 16(b), the main CPU 40 stands by for the start of a "symbol process". When the stop button 4 is operated by the player, after the process of lining up the predetermined symbol which has been internally won on a pay line is performed, the main CPU performs an excitation process (stop control) through two-phase excitation (e.g., the C- and D-phases) via the motor drive circuit 20, the excitation process being performed according to an operation of the player on the stop button 4 when the lining-up process is not performed (S302). While the excitation process through two-phase excitation is in progress, the vibration-suppressing effect is exerted by the vibration-suppressing member 75 in parallel.

The main CPU 40 measures the duration of the excitation process through two-phase excitation (S303). When a predetermined time passes, the process at S304 results in "YES", and the main CPU 40 terminates the excitation process through two-phase excitation (stop control) through the motor drive circuit 20 (S305). The vibration-suppressing effect of the vibration-suppressing member 75 terminates at the same time when the reels 3 stop because it is a mechanical braking mechanism.

FIG. 16(c) shows a flow of the above-described "third reel stopping process". In this "third reel stopping process", the vibration-suppressing effect of the vibration-suppressing member 75 is exerted in parallel with the "first reel stopping process" shown in FIG. 16(a). Since the flow of the "third reel stopping process" is therefore similar to the flow of the "first reel stopping process" described above, no detail will be given on the flow.

(Operations and Effects of the Motor Stop Control Device)

According to the invention of the application as thus described, since the deceleration transmission mechanism 700 transmits the rotation of the stepping motor 70 to the rotating shaft for rotating the reels 3 at a predetermined reduction ratio, a designer can adopt a low cost stepping motor having small rotational torque.

Since the main CPU 40 executes stop control through two-phase excitation over the stepping motor 70 after executing control for reducing the rotating speed of the stepping motor 70, the main CPU 40 can stop the reels 3 at accurate positions. Further, since the main CPU 40 can execute stop control of the stepping motor using only two-phase excitation, the main CPU 40 can stop the reels 3 at more accurate positions.

Further, since the main CPU 40 executes control for reducing the rotating speed of the stepping motor 70, the main CPU 40 can stop the reels 3 at accurate positions with a less reduction in the smoothness of braking of the stepping motor 70 than in reducing the rotating speed of the stepping motor 70 abruptly. As a result, the stopping of the reel 3 is not dependent upon braking with detent torque, no balance adjustment as described above is required at the time of manufacture, which allows operators to manufacture reel units with a smaller number of steps.

Furthermore, since the vibration-suppressing member 75 is always urged against the reels 3, the vibration-suppressing member 75 can damp any vibration of the reels 3 when the reels 3 stop rotating. As a result, the vibration-suppressing member 75 allows the reels 3 to be stopped at accurate positions without reducing the smoothness of braking of the stepping motor 70. Since no balance adjustment as described above is required at the time of manufacture because of the provision of the vibration-suppressing member 75, operators can manufacture reel units with a smaller number of steps.

(First Modification)

The invention is not limited to the above embodiment and may be modified as described below. The modification includes an oil damper 90 instead of the vibration-suppressing member. 75 according to the above-described embodiment. FIG. 17 shows a perspective view of the oil damper 90 according to this embodiment.

As shown in FIG. 17, the oil damper 90 has a rotating portion 91 and a base portion 92. An oil having predetermined viscosity is charged in the base portion 92. A rotating force of the rotating portion 91 is buffered by the oil charged in the base portion 92.

Figure 18:
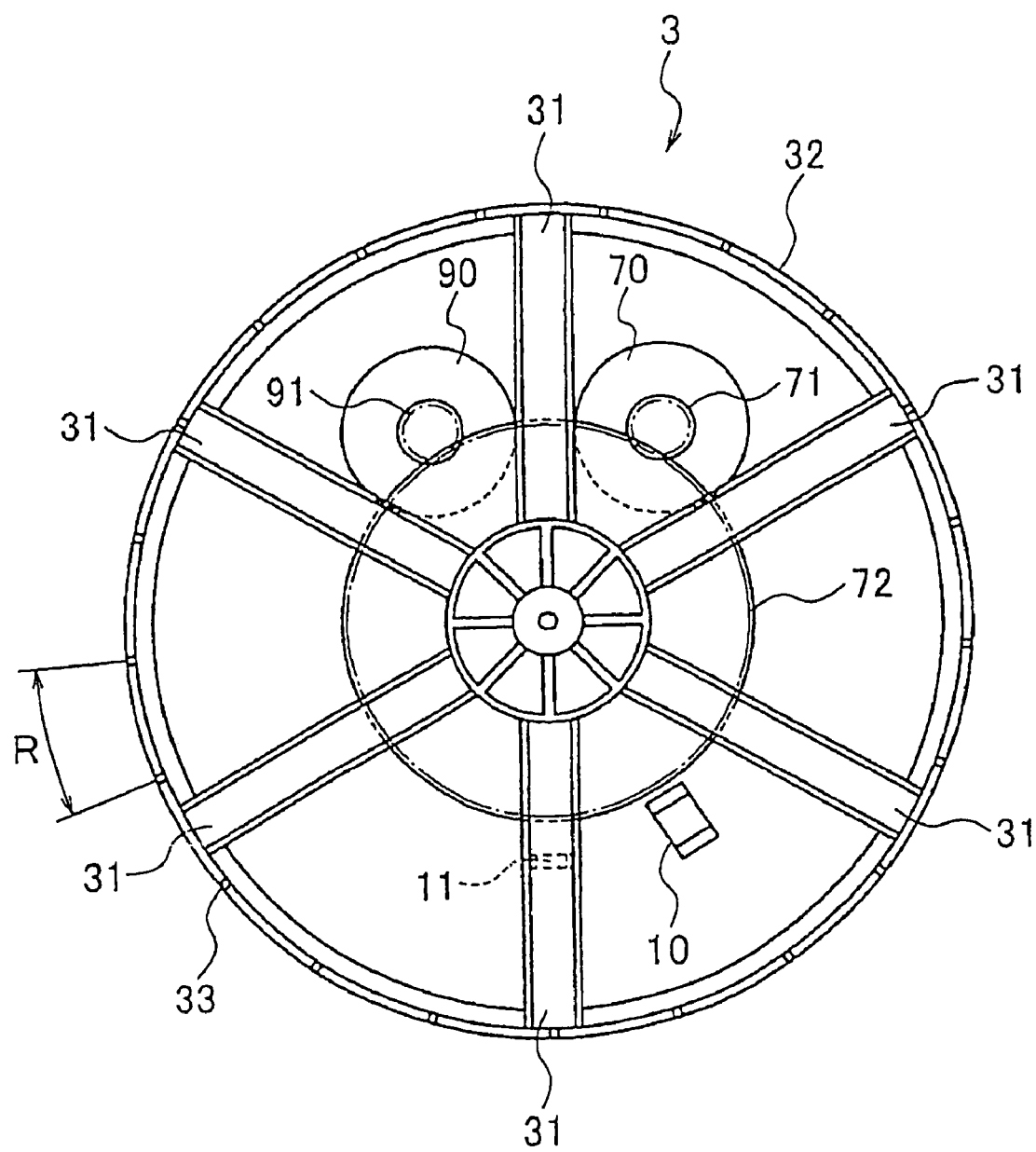
FIG. 18 shows a positional relationship between the oil dampers in the first modification.

FIG. 18 shows a positional relationship of the oil damper according to this modification. The oil damper 90 is disposed inside a reel 3 such that a gear formed at the rotating portion 91 is in contact with the input-side gear 92, as shown in FIG. 18.

According to this modification, the rotating force of the rotating portion 91 is moderated by the oil charged in the base portion 92 (a buffering force). As a result, since the gear formed at the rotating portion 91 is in contact with the input-side gear 72, the oil damper 90 exhibits a braking function when the reel 3 stops rotating because of the buffering force of the rotating portion 91. The oil damper 90 allows vibration of the reel 3 occurring when the stepping motor 70 is braked (or at the time of backlash) to be damped quickly.

(Second Modification)

The invention is not limited to the above-described embodiment and may be modified as described below. The modification includes a felt 751, a high-friction member such as rubber, or a wave washer 752 instead of the vibration-suppressing member 75 according to the above embodiment.

Figure 19:
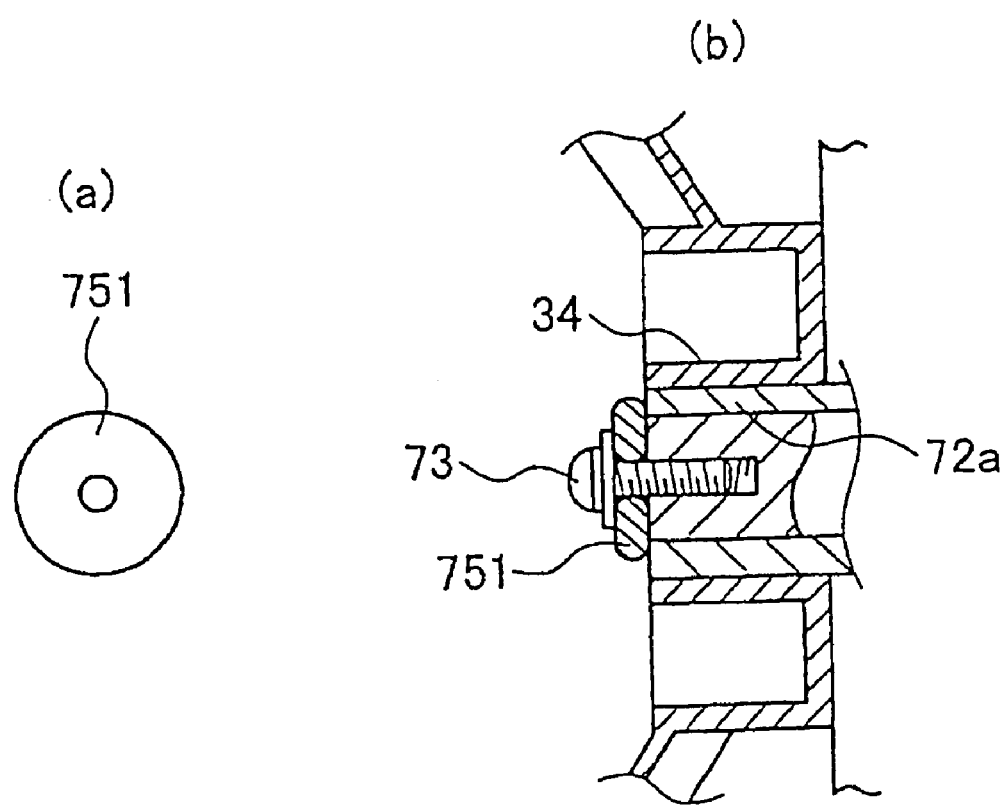
FIG. 19, consisting of FIG. 19(*a*) to 19(*b*), is showing a structure of felts in a second modification and a positional relationship between them.

FIG. 19(*a*) shows a configuration of the felt 751 taken from the above. FIG. 19(*b*) shows a positional relationship in which the felt 751 is provided. As shown in FIGS. 19(*a*) and (*b*), the felt 751 is in a circular shape and is formed with a hole in which the fastening member 73 can be inserted in the middle thereof. The felt 751 is removal-stopped by the fastening member 73.

Figure 20:
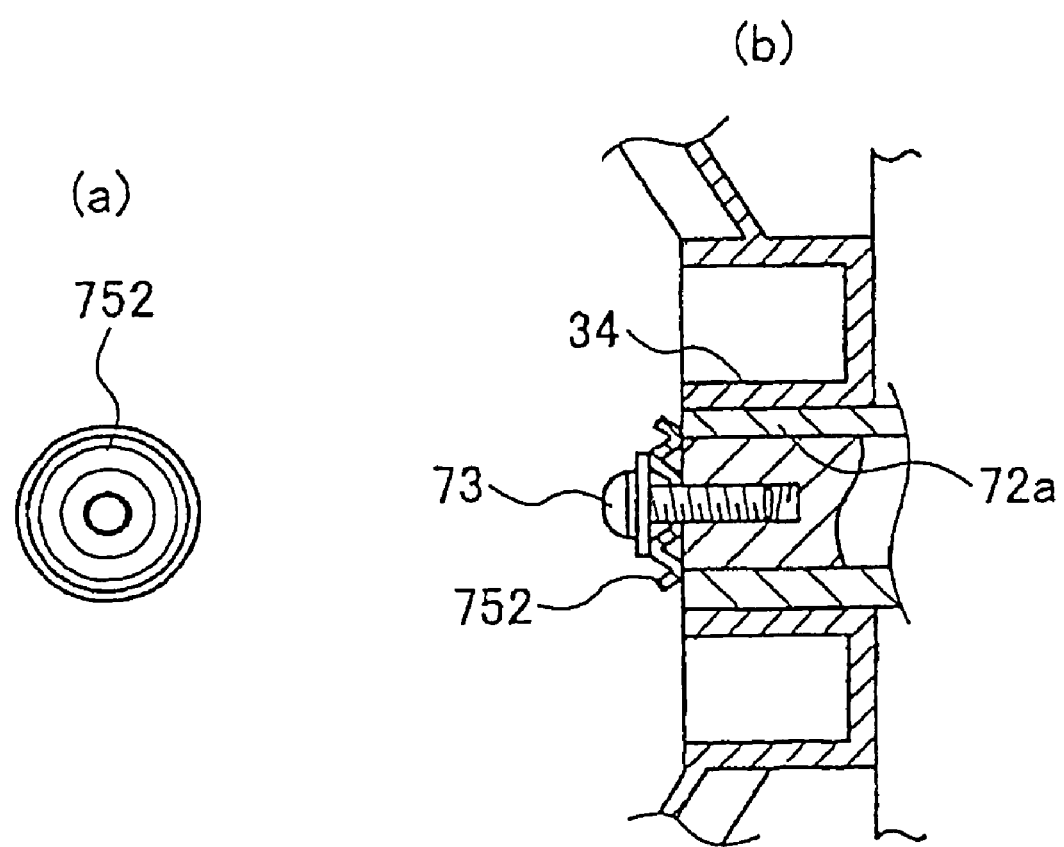
FIG. 20, consisting of FIG. 20(*a*) to 20(*b*), is showing a structure of wave washers in the second modification and a positional relationship between them.

FIG. 20(*a*) shows a configuration of the wave washer 752 taken from the above. FIG. 20(*b*) shows a positional relationship in which the wave washer 752 is provided. As shown in FIGS. 20(*a*) and (*b*), the wave washer 752 is in a planar shape having waves traveling outward from the center and is formed with a hole in which the fastening member 73 can be inserted in the middle thereof. The wave washer 752 is removal-stopped by the fastening member 73.

In this case, a high-friction member including the felt 751 and the wave washer 752 removal-stopped by the fastening member 73 can damp any vibration of the reel 3 occurring at the time of braking because of the frictional force of the high-friction member.

(Third Modification)

The invention is not limited to the above-described embodiment and may be modified as described below. In this modification, the output-side gear 71 and the input-side gear 72 of the above-described embodiment are formed by rubber rollers 711 and 721.

Figure 21:
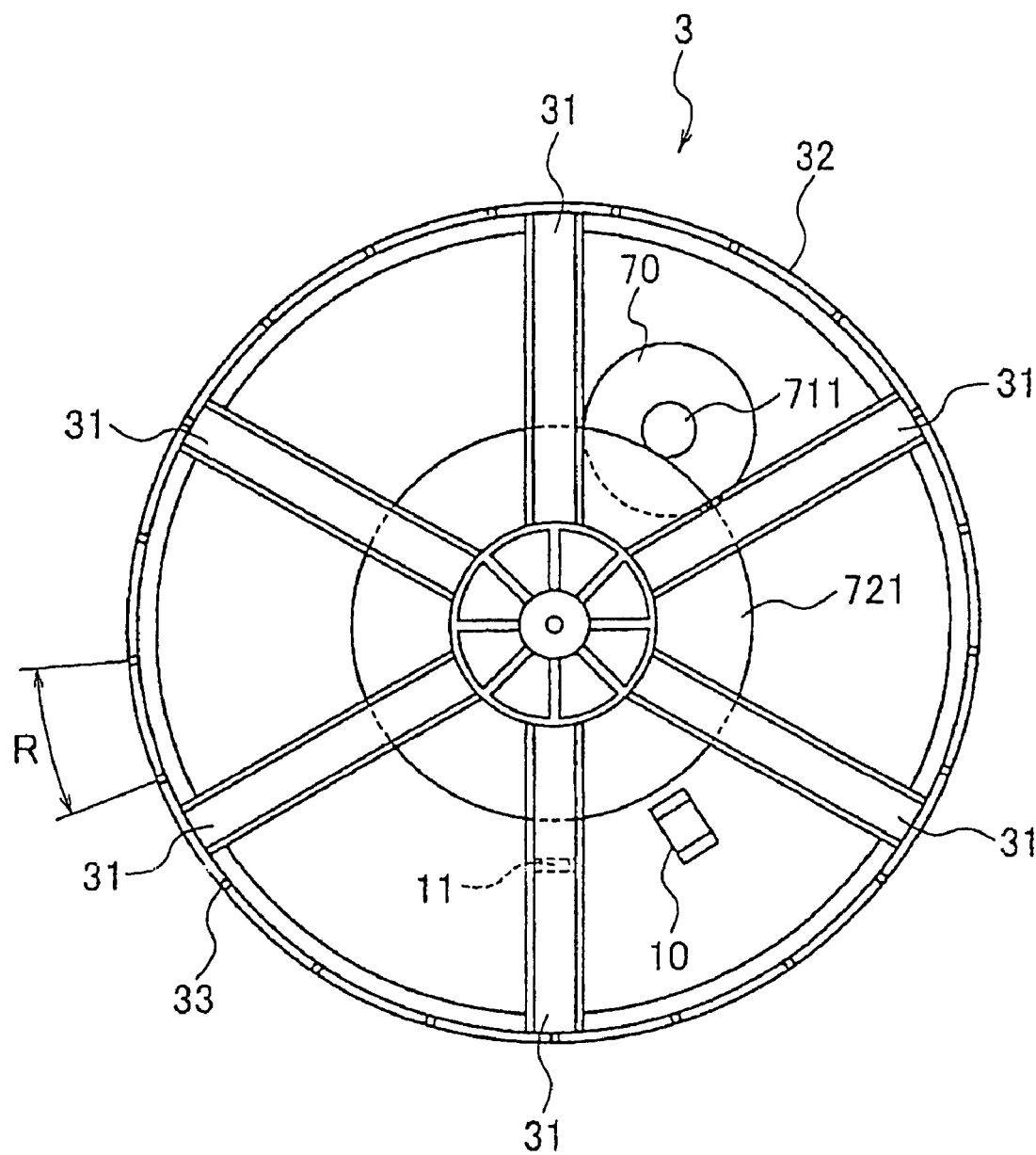
FIG. 21 shows a positional relationship between rubber roller felts in a third modification.

FIG. 21 shows a positional relationship in which the rubber rollers 711 and 721 are provided. The two rubber rollers 711 and 721 are in contact with each other and transmit rotation without slip because of their high frictional coefficient. The two rubber rollers 711 and 721 are disposed inside a reel 3. Thus, when vibration occurs at the shaft of the reel 3 at the time of braking of the stepping motor 70 (or at the time of backlash), the rubber rollers 711 and 721 undergo elastic deformation to allow the vibration to be absorbed.

Figure 22:
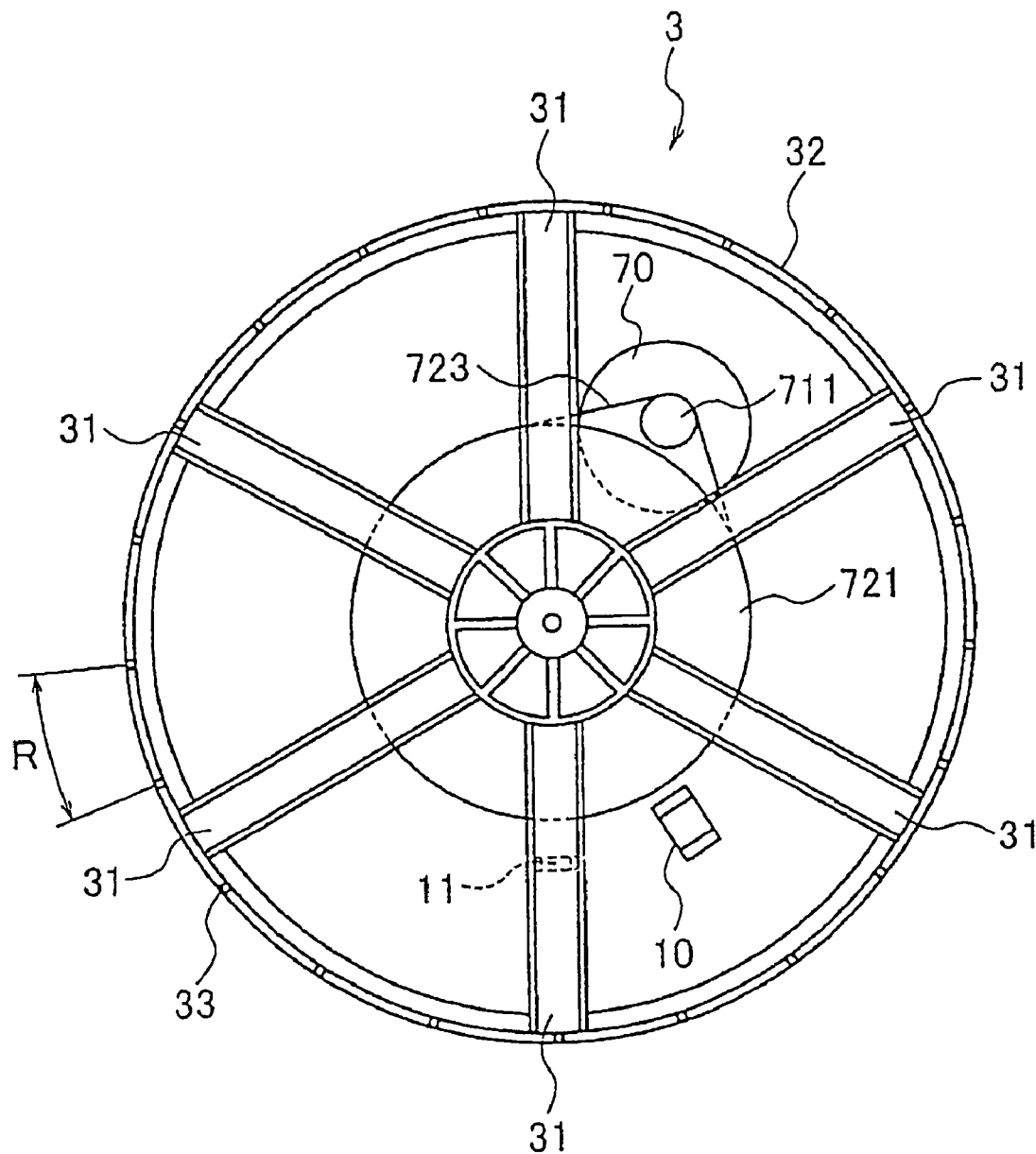
FIG. 22 shows a positional relationship between an output-side gear, an input-side gear, and a timing belt in the third modification.

This modification may have a configuration in which an expandable and contractible belt 723 formed by a soft member including rubber or urethane is stretched around an output-side pulley 71 and an input-side pulley 72 instead of the output-side gear 71 and the input-side gear 72 formed by spur gears. FIG. 22 shows a positional relationship in which the output-side pulley 71, the input-side pulley 72 formed of rubber and the belt 723 are provided. Both of the output-side pulley 71 and the input-side pulley 72 rotate as the belt 72 stretched around the output-side pulley 71 and the input-side pulley 72 rotates.

Thus, when vibration occurs at the shaft of the reel 3 at the time of braking of the stepping motor 70 (or at the time of backlash), the belt 72 formed by a soft member expands and contracts to absorb the vibration.

In this modification, either of the output-side gear 71 and the input-side gear 72 formed by spur gears may be a scissors gear. Thus, backlash of the gears can be eliminated to provide a configuration that is unlikely to vibrate, and the output-side gear or input-side gear formed by a scissors gear can absorb any vibration occurring at the shaft of the reel 3 at the time of braking of the stepping motor 70. The material of the spur gears may be changed to soft members such as polyamide. The spur gears comprising soft members undergo elastic deformation to allow any vibration occurring at the shaft of the reel 3 to be absorbed.

In this embodiment, a decelerating process is added to stop control over the stepping motor 70 which rotates at a constant speed, but the invention is not limited to rotation at a constant speed. For example, a deceleration process may be performed for stop control of a reel 3 whose rotating speed varies between 60 rpm and 80 rpm.

Although a PM type is used as the stepping motor 70 in this embodiment, this is not limiting the invention, and a hybrid type may be used in the direct driving method.

As described above, the invention makes it possible to reduce the cost of a stepping motor, to manufacture a reel unit with a small number of steps, and to stop reels at accurate positions without reducing the smoothness of braking of a stepping motor.

Although only some exemplary embodiments of this invention have been described in detail above, those skilled in the art will readily appreciated that many modifications are possible in the exemplary embodiments without materially departing from the novel teachings and advantages of this invention. Accordingly, all such modifications are intended to be included within the scope of this invention.

What is claimed is:

1. A motor stop control device for a rotating reel type gaming machine that includes a motor having two pairs of excitation phases as a driving source of a reel, the reel having a plurality of symbols drawn thereon, the motor stop control device comprising:
   a deceleration transmission mechanism that transmits the rotation of the motor to rotating shafts so that the reel is rotated at a predetermined speed reduction ratio;
   motor stop control means for performing stop control of the motor through two-phase excitation; and
   a vibration-suppressing member that dampens vibration of the reel that occurs when the rotation of the reel is stopped by the stop control of the motor stop control means,
   wherein the motor is a stepping motor,
   wherein the deceleration transmission mechanism has an output-side gear provided on a driving side of the stepping motor and an input-side gear disposed at the reel such that the input-side gear is in contact with the output-side gear and coaxial with the rotating shaft of the reel, and
   wherein the vibration-suppressing member is an oil damper having a base portion in which an oil is charged and a rotating portion having a gear which is in contact with the input-side gear, and a rotating force of the rotating portion is moderate by the oil charged in the base portion.

2. The motor stop control device of claim 1, wherein the stop control of the motor stop control means comprises a first stop control for reducing the rotating speed of the motor by transmitting pulses for causing two-phase excitation for a first predetermined time.

3. The motor stop control device of claim 2, wherein the stop control of the motor stop control means comprises a second stop control through two-phase excitation for a second predetermined time after performing the first stop control.

4. The motor stop control device according to claim 1, further comprising:
   a mounting plate for fixing the rotating shaft,
   wherein the input-side gear is inserted into the rotating shaft, and the vibration-suppressing member is a spring that is inserted into the rotating shaft and urges the input-side gear against the mounting plate.

5. The motor stop control device of claim 1, wherein the vibration-suppressing member is a high-friction member that is fastened to the rotating shaft to a fastening member.

6. The motor stop control device of claim 5, wherein the high-friction member is felt.

7. The motor stop control device of claim 5, wherein the high-friction member is a wave washer.

8. The motor stop control device according to claim 1, wherein the stop control is performed in parallel with a vibration-suppressing effect by the vibration-suppressing member.

9. The motor stop control device of claim 1, wherein the speed reduction ratio is determined by a ratio between a number of steps of one rotation of the motor, and the least common multiple calculated from a number of the symbols drawn on the reel and the number of steps of the motor.

10. The motor stop control device of claim 1, wherein the motor stop control means for performs stop control of the motor through two-phase excitation after performing a control for reducing the rotating speed of the motor based on a stop command for the motor.

11. A motor stop control device or a rotating reel type gaming machine that includes a motor having two pairs of excitation phases as a driving source of a reel, the reel having a plurality of symbols drawn thereon, the motor stop control device comprising:
    a deceleration transmission mechanism that transmits the rotation of the motor to rotating shafts so that the reel is rotated at a predetermined speed reduction ratio;
    motor stop control means for performing stop control of the motor through two-phase excitation after performing a control for reducing the rotating speed of the motor based on a stop command for the motor; and
    a vibration-suppressing member that dampens vibration of the reel that occurs when the rotation of the reel is stopped by the stop control of the motor stop control means,
    wherein the motor is a stepping motor,
    wherein the deceleration transmission mechanism has an output-side gear provided on a driving side of the stepping motor and an input-side gear disposed at the reel such that the input-side gear is in contact with the output-side gear and coaxial with the rotating shaft of the reel,
    wherein the speed reduction ratio is determined by a ratio between a number of steps of one rotation of the motor, and the least common multiple calculated from a number of the symbols drawn on the reel and the number of steps of the motor and
    wherein the vibration-suppressing member is an oil damper having a base portion in which an oil is charged and a rotating portion having a gear which is in contact with the input-side gear, and a rotating force of the rotating portion is moderate by the oil charged in the base portion.

* * * * *